United States Patent
Chojnacki

(10) Patent No.: US 11,842,572 B2
(45) Date of Patent: Dec. 12, 2023

(54) DEVICE, SYSTEM, AND METHOD OF COMPUTER VISION, OBJECT TRACKING, IMAGE ANALYSIS, AND TRAJECTORY ESTIMATION

(71) Applicant: Baseline Vision Ltd., Tel Aviv (IL)

(72) Inventor: Michael Chojnacki, Tel Aviv (IL)

(73) Assignee: BASELINE VISION LTD., Tel Aviv (IL)

( * ) Notice: Subject to any disclaimer, the term of this patent is extended or adjusted under 35 U.S.C. 154(b) by 528 days.

(21) Appl. No.: 17/252,752

(22) PCT Filed: Jun. 19, 2019

(86) PCT No.: PCT/IL2019/050684
§ 371 (c)(1),
(2) Date: Dec. 16, 2020

(87) PCT Pub. No.: WO2019/244153
PCT Pub. Date: Dec. 26, 2019

(65) Prior Publication Data
US 2021/0264141 A1 Aug. 26, 2021

Related U.S. Application Data

(60) Provisional application No. 62/687,820, filed on Jun. 21, 2018.

(51) Int. Cl.
*G06V 40/20* (2022.01)
*G06T 7/292* (2017.01)
(Continued)

(52) U.S. Cl.
CPC .......... *G06V 40/23* (2022.01); *A63B 24/0021* (2013.01); *G06T 7/292* (2017.01);
(Continued)

(58) Field of Classification Search
None
See application file for complete search history.

(56) References Cited

U.S. PATENT DOCUMENTS

| | | | | |
|---|---|---|---|---|
| 5,491,517 A | * | 2/1996 | Kreitman | H04N 5/272 348/581 |
| 8,199,199 B1 | * | 6/2012 | Shlyak | G06T 7/70 348/157 |

(Continued)

OTHER PUBLICATIONS

Cross et al., "Measurement of drag and lift on tennis balls in flight," Sports Eng (2014) 17:89-96 (Year: 2014).*
(Continued)

*Primary Examiner* — Soo Shin
(74) *Attorney, Agent, or Firm* — AlphaPatent Associates Ltd.; Daniel J. Swirsky

(57) ABSTRACT

Device, system, and method of computer vision, object tracking, and image analysis; particularly suitable or configured for analysis of images or videos of tennis. A device includes two adjacent and co-located cameras, oriented at an angle of 20 to 120 degrees relative to each other, capturing a combined field-of-view that covers at least 75 percent of an entirety of a tennis court. A processor analyzes the captured images or video using computer-vision algorithms, and detects a ball bounce event and its properties. Insights are generated with regard to the performance of one or more of the participating players.

16 Claims, 17 Drawing Sheets

(51) Int. Cl.
*A63B 24/00* (2006.01)
*G06V 20/40* (2022.01)
*A63B 102/02* (2015.01)

(52) U.S. Cl.
CPC ...... *G06V 20/42* (2022.01); *A63B 2024/0034* (2013.01); *A63B 2024/0043* (2013.01); *A63B 2102/02* (2015.10); *A63B 2220/05* (2013.01); *A63B 2220/20* (2013.01); *A63B 2220/30* (2013.01); *A63B 2220/807* (2013.01); *G06T 2200/24* (2013.01); *G06T 2207/30224* (2013.01); *G06T 2207/30241* (2013.01); *G06V 20/44* (2022.01)

(56) References Cited

U.S. PATENT DOCUMENTS

| | | | | |
|---|---|---|---|---|
| 2008/0268989 | A1* | 10/2008 | Lalvani | A63B 41/08 473/598 |
| 2013/0039538 | A1* | 2/2013 | Johnson | G06T 7/20 382/103 |
| 2016/0212385 | A1 | 7/2016 | Ginsberg | |
| 2017/0061817 | A1* | 3/2017 | Mettler May | A61B 5/1123 |
| 2018/0117411 | A1 | 5/2018 | Meetin | |
| 2018/0154232 | A1* | 6/2018 | Gentil | H04N 21/21805 |
| 2018/0200602 | A1* | 7/2018 | Simón Vilar | A63B 71/0605 |
| 2018/0357472 | A1* | 12/2018 | Dreessen | G06V 20/49 |
| 2019/0109966 | A1* | 4/2019 | Kirk, III | H04N 23/50 |
| 2021/0264141 | A1* | 8/2021 | Chojnacki | G06T 7/292 |
| 2023/0110640 | A1* | 4/2023 | Kweon | A63B 69/38 700/275 |
| 2023/0218969 | A1* | 7/2023 | Weinlader | A63B 69/40 473/436 |

OTHER PUBLICATIONS

International Search Report in PCT/IL2019/050684, dated Sep. 25, 2019.
Written Opinion of the International Searching Authority in PCT/IL2019/050684, dated Sep. 25, 2019.

* cited by examiner

DEVICE, SYSTEM, AND METHOD OF COMPUTER VISION, OBJECT TRACKING, IMAGE ANALYSIS, AND TRAJECTORY ESTIMATION

CROSS-REFERENCE TO RELATED APPLICATIONS

This patent application is a National Stage of PCT international application number PCT/IL2019/050684, having an international filing date of Jun. 19, 2019, published as International Publication number WO 2019/244153 A1, which is hereby incorporated by reference in its entirety; which claims priority and benefit from U.S. 62/687,820, filed on Jun. 21, 2018, which is hereby incorporated by reference in its entirety.

FIELD

The present invention relates to the field of computer vision and image analysis.

BACKGROUND

Computer vision is a scientific field that handles how computerized systems can be programmed of configured to gain high-level understanding based on one or more digital images or video segments. From an engineering aspect, computer vision seeks to automate some tasks that the visual system of a human is naturally able to perform.

Computer vision systems may utilize methods for acquiring digital images or video clips, processing them, and extracting from them one or more data-items or insights which correspond to real-world data or characteristics. For example, a computer vision system may receive and analyze a live stream of video data from a security camera, in order to detect an intruder or a hazardous condition.

SUMMARY

The present invention provides devices, systems, and methods of computer vision, object tracking, and image analysis; particularly suitable for sports-related or athletics-related purposes, for example, tracking the movement and/or location and/or other properties of a sports player, a sporting event participant (e.g., player, umpire or referee, coach, or the like), a ball, a racket, a sports accessory, or the like; and/or for generating insights or determinations with regard to the location and/or movement and/or scoring and/or performance of such player(s) and/or accessories.

For example, a device includes two adjacent and co-located cameras, oriented at an angle of 20 to 120 degrees relative to each other, capturing a combined field-of-view that covers substantially an entirety of a tennis court. A processor analyzes the captured images or video, recognizes and detects a ball and a bounce event, calculates its entire trajectory and physical properties. Insights are generated with regard to the performance of one or more of the participating players.

DETAILED DESCRIPTION OF SOME DEMONSTRATIVE EMBODIMENTS OF THE PRESENT INVENTION

Figure 1:
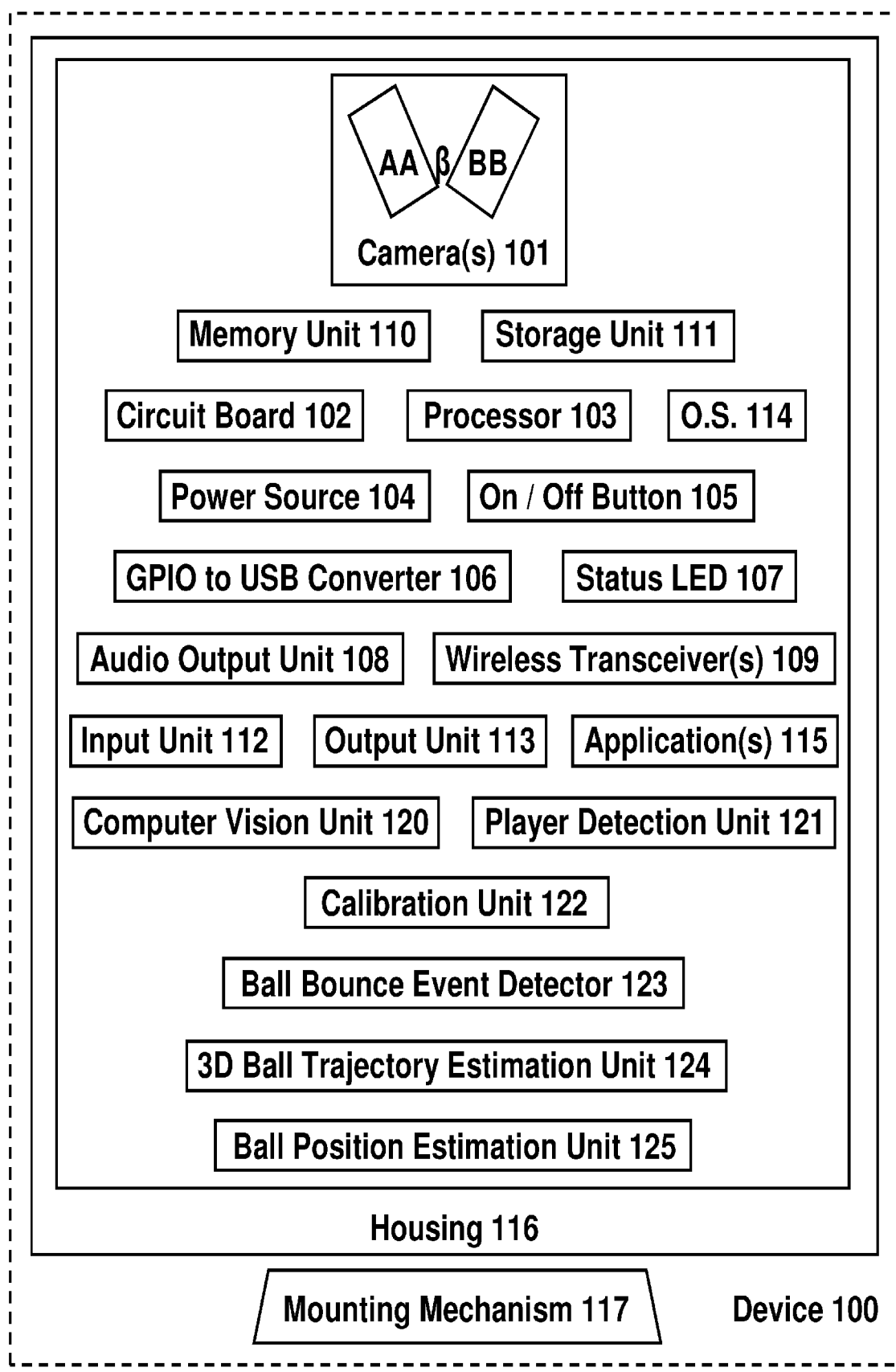
FIG. 1 is a schematic block-diagram illustration of a device, in accordance with some demonstrative embodiments of the present invention.

Some embodiments of the present invention relate to the field of computer vision, computerized image analysis and video analysis, and object recognition, and object tracking. Some embodiments may comprise systems, devices, and methods for automated tracking of a ball (e.g., a tennis ball) or other accessory or item or object, particularly in a sports game or a sporting event (e.g., a tennis match), and/or for determining or estimating properties of the ball and/or of the player(s) or their movement or motion or location or acceleration, and/or for generating insights with regard to the performance of one or more player(s).

The Applicants have realized that object tracking and motion estimation may be utilized in sports for various purposes; for example: for scoring purposes, for score determination purposes, for arbitration purposes, for teaching purposes, for training purposes, for determining a bounce location of the ball, to enhance or improve a player's experience or skills, to improve the player's performance, and/or to assist the player to understand his needs, his weaknesses, his strengths, and/or other characteristics of his performance of abilities.

The Applicants have realized in some popular sports, such as Tennis, Basketball, Volleyball and Soccer, a major portion of the ability to perform well comprises (or may benefit from) core capabilities of detecting, tracking, and/or locating the ball as well as other player(s) (e.g., players from the same team, and/or players of another team), and interacting efficiently and rapidly and timely with the ball and/or with other player(s).

For demonstrative purposes, portions of the discussion herein may relate to Tennis, as well as to tracking of a tennis ball and/or tennis players; however, embodiments of the present invention may further comprise systems, devices, and methods for monitoring other types of sports or games or matches or sporting events, as well as other types of players (e.g., soccer players, basketball players, or the like) and/or sporting equipment (e.g., ball, racquet, soccer ball, basketball, hockey puck or disk, or the like). In some implementations, the systems and methods of the present invention may be useful in conjunction with tennis-like or tennis-resembling sports or activities; for example, table tennis or ping-pong, badminton, squash, padel tennis, and other racket sports or racket-based sports. In some embodiments, the device and system of the present invention may be adapted or configured or modified, to match or to accommodate one or more particular features of such sports game or sports type. For example, when the system of the present invention is utilized in conjunction with badminton, the system may track and recognize and detect the movement, location, speed, and other properties of the shuttlecock (rather than a tennis ball); and may search for its unique shape or visual properties across images or frames; and may further calculate and take into account and increase drag (air friction force) that a badminton shuttlecock is subject to (e.g., a significantly greater drag force, compared to a tennis ball in a tennis match). Similarly, the angle or slanting between the two cameras of the device, may be adapted or modified based on the sporting game being monitored; for example, having an angle in the range of 50 to 120 degrees between the two cameras for tracking a game of tennis, or having an angle in the range of 60 to 130 degrees between the two cameras for tracking a game of ping pong or table tennis, or having an angle in the range of 50 to 120 degrees between the two cameras for tracking a game of badminton, or having an angle in the range of 60 to 130 degrees between the two cameras for tracking a game of padel tennis, or the like.

The present invention provides a computerized vision system, particularly tailored to assist or guide players of tennis. The system detects, tracks and analyzes the three-dimensional movement of multiple players and the ball itself, from a single viewpoint and/or by utilizing a single electronic device having a single housing which can be efficiently mounted, installed and/or operated.

Reference is made to FIG. 1, which is a schematic block-diagram illustration of a device 100, in accordance with some demonstrative embodiments of the present invention. Device may comprise: one or more cameras 101; a circuit board 102 or Integrated Circuit (IC), and/or a processor 103 or other suitable controller; a power source 104 (e.g., a battery, a power cell, a rechargeable battery, a solar panel and associated solar-based energy generator) for providing power to the various components, associated and interfacing with a power ON/OFF button 105 (e.g., a physical button; an on-screen button; a slider mechanism; a physical switch; or the like); a GPIO (General Purpose Input/Output)-to-USB protocol converter 106; a Status LED 107 or other status indicator (e.g., which reports the calibration status); an audio output unit 108 (e.g., an audio speaker, to produce audible outputs); one or more wireless transceivers 109 (e.g., Wi-Fi, cellular, Bluetooth, Zigbee) which enable the device 100 to communicate with other devices (e.g., smartphone, tablet, laptop computer, smartwatch, fitness bracelet) and/or with a remote server or a cloud-computing server or repository (e.g., over the Internet); a memory unit 110 for short-term storage of data (e.g., Random Access Memory (RAM), or Flash memory; a storage unit 111 for long-term or non-volatile storage of data (e.g., a solid state drive (SDD); a hard disk drive (HDD); an SD card); an optional input unit 112 (e.g., keyboard, keypad, buttons, sliders, touch-screen, microphone, or other User Interface (UI) or Graphical UI (GUI) elements or components); an optional output unit 113 (e.g., a screen, a display unit, a touch-screen); an optional Operating System (OS) 114 and optionally one or more applications 115 which may be installed on the device 100 (e.g., in order to upgrade and/or improve its capabilities or to add functionalities). The components of device 100 are typically enclosed within a housing 116 which holds them in place. The housing may comprise, or may be attached to, a mounting mechanism 117 which allows the entire device 100 to be mounted on, or attached to, or securely placed on, or be held by, another item or structure (e.g., a frame or a rod that holds a net in a tennis court; a referee high-chair or umpire high-chair; or the like). Optionally, a cellular transmitter or transceiver, such as a cellular 4G or 4G-LTE or 5G transceiver, may be included in device 100, or may be attached or connected to device 100 (e.g., as a USB-based "dongle" or accessory), thereby enabling device 100 to upload or transmit data to a remote server or a remote cloud-computing platform (e.g., raw data, image data, video data, analytics data, analyzed data, performance data, or the like).

For example, the imager(s) of device 100 may capture one or more images or frames, or a video segment comprised of frames; and such captured images or video may be stored in the memory unit and/or the storage unit, and may be processed or analyzed by the processor.

A computer vision unit 120 may execute one or more computer vision algorithms, image analysis operations, and/or other processing operations or analysis operations that are detailed herein.

A player detection unit 121 may utilize a computer vision algorithm or machine learning processes to detect a sports-player in the images, and/or to track such player across multiple frames or images.

A manual calibration unit 122 may perform manual calibration operations that are described herein; for example, capturing an initial manual-calibration image of the specific tennis ball in idle state, and/or an initial manual-calibration image of the specific surface of the specific tennis court, and/or an initial manual-calibration image of the specific court-lines of the specific tennis court, and/or an initial manual-calibration image of the specific human tennis players; and then, extracting from such images, one or more unique visual features of these items, in order to enable accurate and/or improved calculation of physical properties of the ball flight and/or the players location and motion.

A ball bounce event detector 123 may perform the operations described herein with regard to detecting a ball bounce event and its occurrence.

A three-dimensional (3D) ball trajectory estimation unit 124 may perform the operations described herein with regard to recognizing, calculating and/or determining parameters that describe one or more properties of the three-dimensional flight of the ball.

A ball position estimation unit 125 may perform the operations described herein with regard to estimating or determining the ball position.

For demonstrative purposes, the one or more cameras 101 are further shown as comprising two co-located cameras, denoted AA and BB; which are slanted relative to each other at an angle denoted β, which may be in the range of 20 to 120 degrees. The cameras may capture images or video, for example, through a hollow aperture or through a transparent portion in the housing of the device. In some embodiments, the angle denoted β may be 80 degrees, or in the range of 70 to 90 degrees, or in the range of 60 to 100 degrees, or in the range of 50 to 110 degrees, particularly when the device is utilized for tracking a game of tennis. In some embodiments, the angle denoted β may be 90 degrees, or in the range of 80 to 100 degrees, or in the range of 70 to 110 degrees, or in the range of 50 to 120 degrees, particularly when the device is utilized for tracking a game of badminton. In some embodiments, the angle denoted β may be 85 degrees, or in the range of 75 to 95 degrees, or in the range of 65 to 95 degrees, or in the range of 60 to 130 degrees, particularly when the device is utilized for tracking a game of padel tennis or table tennis or ping-pong. In some embodiments, the angle denoted β may be modifiable or configurable, in the range of 20 to 130 degrees. Other suitable values or ranges may be used.

Figure 2:
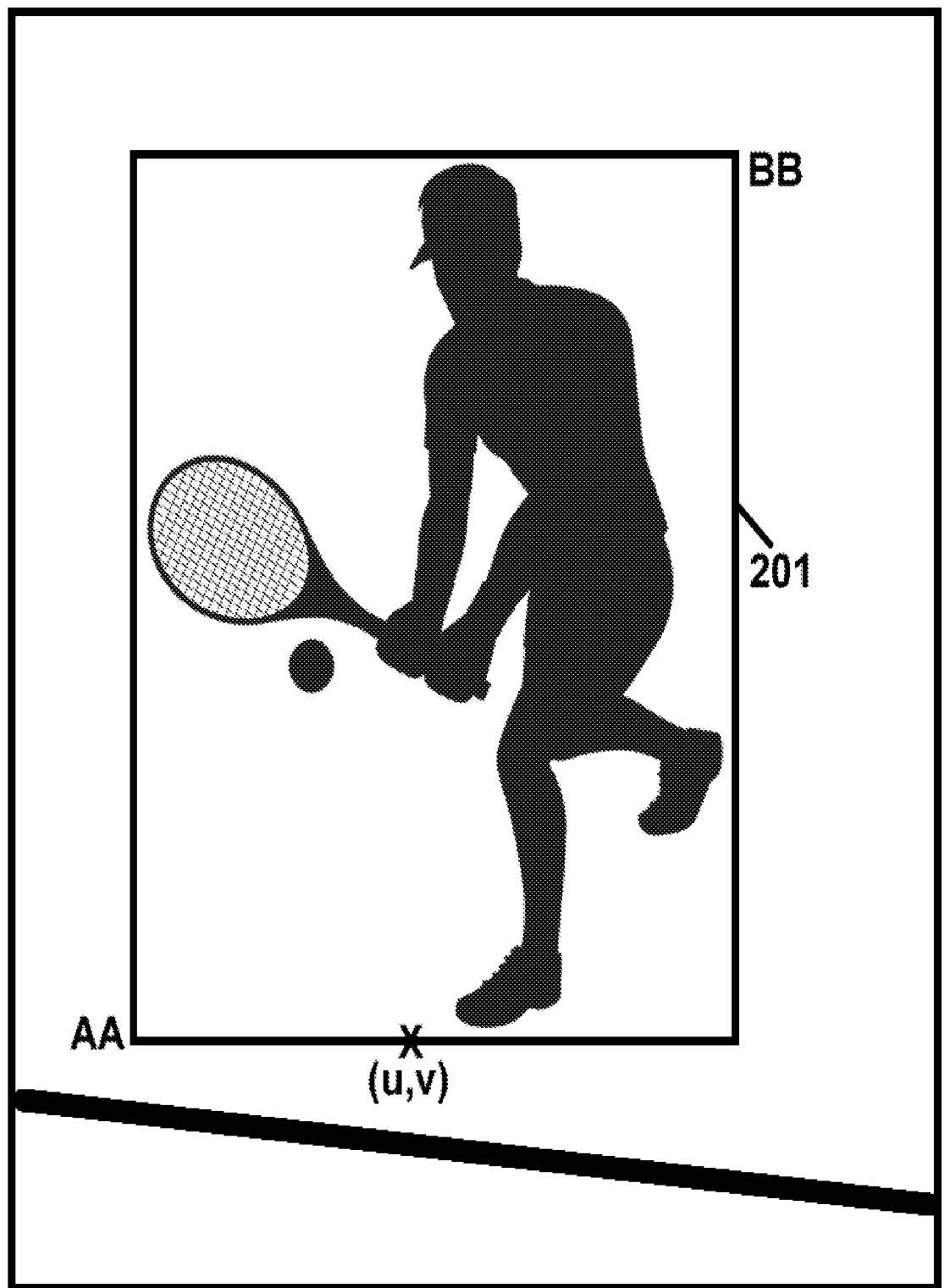
FIG. 2 is a schematic illustration of an image frame, demonstrating a bounding box that fences an image of a person, generated by or resulting from an automatic player detection process in accordance with some demonstrative embodiments of the present invention.

Reference is made to FIG. 2, which is a schematic illustration of an image frame 200 (e.g., captured by the camera(s) of device 100), demonstrating a bounding box 201 that fences an image of a person 202, generated by or resulting from an automatic player detection process in accordance with some demonstrative embodiments of the present invention. For example, a pair of coordinates (u, v) indicate a point on the lower edge of the bounding box 201, relative to the image frames' axis system, and those coordinates may be used to determine the player's position on the court and/or one or more other player properties (e.g., motion, movement, non-movement, jumping, running, walking, bending, or the like).

Figure 3:
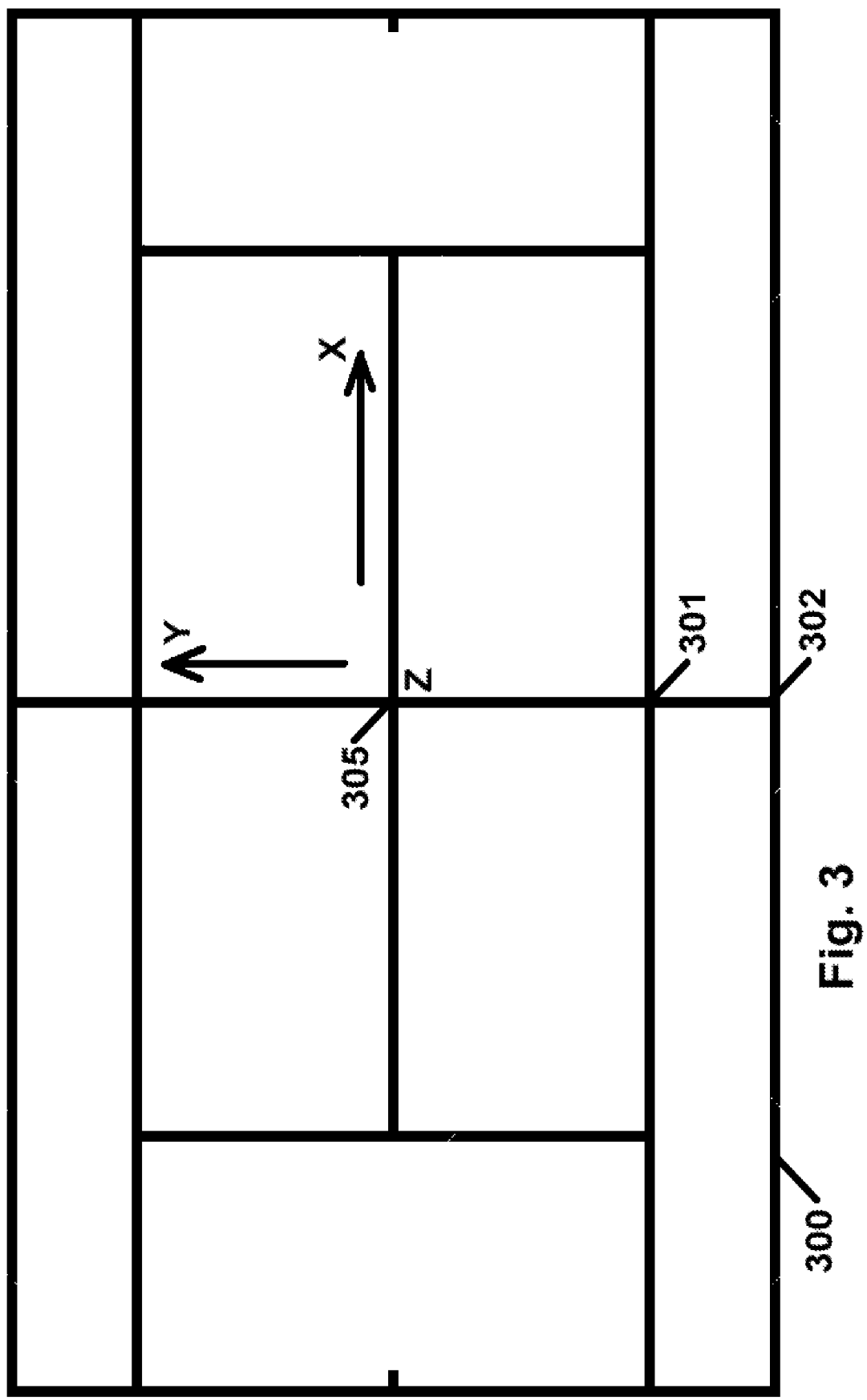
FIG. 3 is a schematic illustration of a tennis court, demonstrating the definition of the court's axis system, and indicating a particular location at which the device may be mounted or placed, in accordance with some demonstrative embodiments of the present invention.

Reference is made to FIG. 3, which is a schematic illustration of a tennis court 300, demonstrating the definition of the court's axis system, and indicating a particular location 301 at which the device 100 may be mounted or placed, in accordance with some demonstrative embodiments of the present invention. The origin of the axis system is positioned (for example) at half-length and half-width of the court, and lies on the court's surface. The X-axis points to, or increases towards, the right of the camera device; the Y axis points to or grows forward or upwardly; and the Z axis completes the right-hand rules pointing upwards. Location 301 demonstrates a possible location for device 100 on the court. The axis system is defined accordingly.

Figure 4:
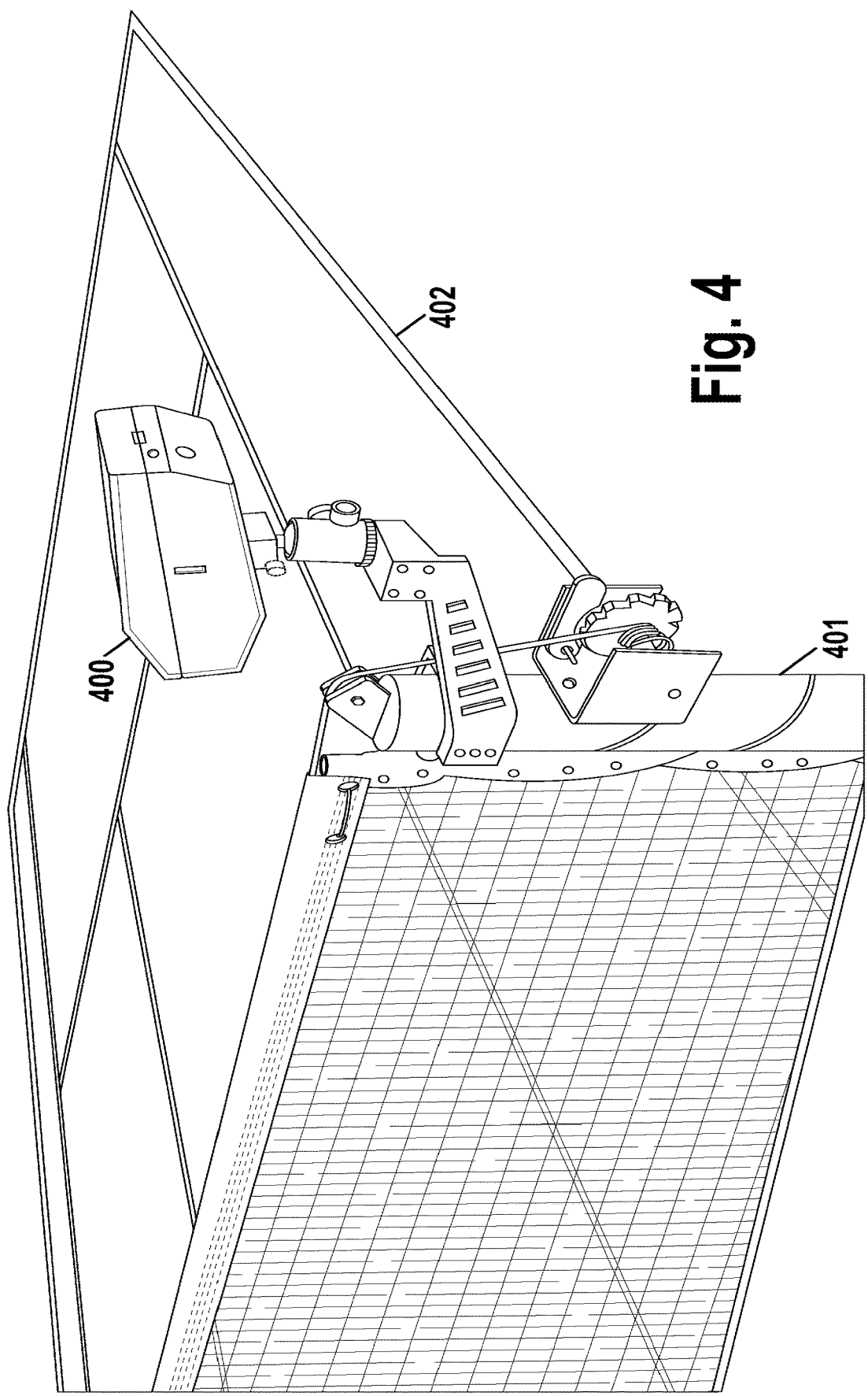
FIG. 4 is an illustration of a camera-based device, installed or mounted on a net-post or a net frame of a tennis court, in accordance with some demonstrative embodiments of the present invention.

Reference is made to FIG. 4, which is an illustration of a camera-based device 400 (e.g., which may be an implementation of device 100), installed or mounted on (or near, or in proximity to) a net-post 401 or a net frame of a tennis court 402, or an edge or frame of a net, in accordance with some demonstrative embodiments of the present invention. For example, an arm or other mounting mechanism (e.g., screws, glue, Velcro, male-female connector, or the like) attaches or can be mounted on the upper part of the net-post or in proximity to a top edge or a top surface of the net-post or the frame or the rod or the pole that holds the net, and may be connected to the device 400 via a complementing attachment or mounting unit of the device. In some embodiments, the device 400 is attached to the net-post or to an arm thereof, via a mechanism that allows for orientation adjustments; for example, enabling a user to rotate or swivel the device 400 towards a different direction or angle.

Figure 5:
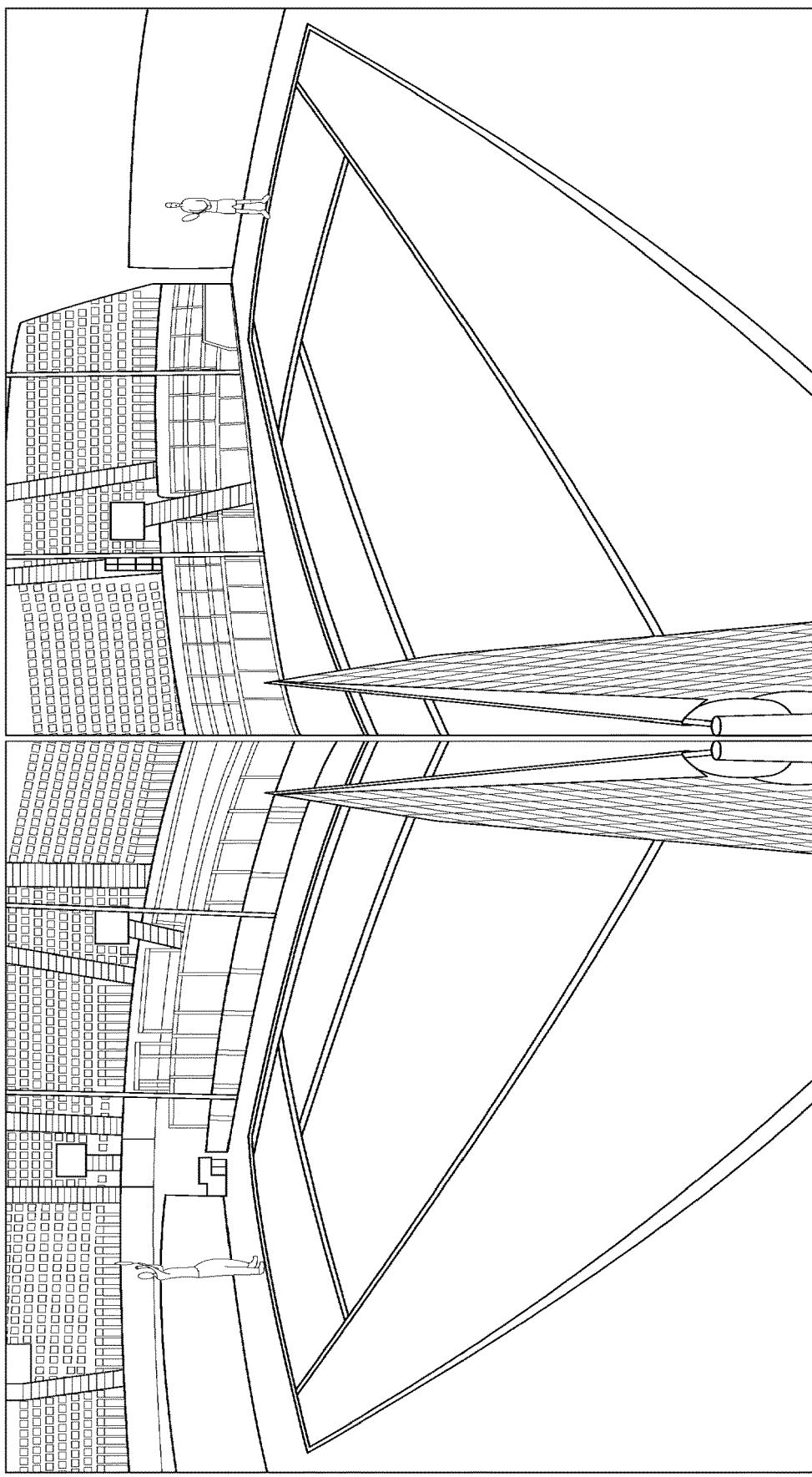
FIG. 5 is an illustration of a dual-frame image formed of two frames that were captured simultaneously by two co-located cameras of the device, in accordance with some demonstrative embodiments of the present invention.

Reference is made to FIG. 5, which is an illustration of a dual-frame image 500 formed of two frames (501, 502) that were captured simultaneously by two cameras of device 100, in accordance with some demonstrative embodiments of the present invention. For example, all the cameras of device 100, when they operate and capture their respective field-of-view areas, are able to cover together the entirety of the court (or, in some implementations, except for a small part in the close proximity to the device 100 itself, such as immediately under the net-post). In such configuration, each one of the two cameras, covers by itself more than one-half of the entire court, with an overlap area around the center of the court that is viewed and captured by each one of the two cameras.

Figure 6:
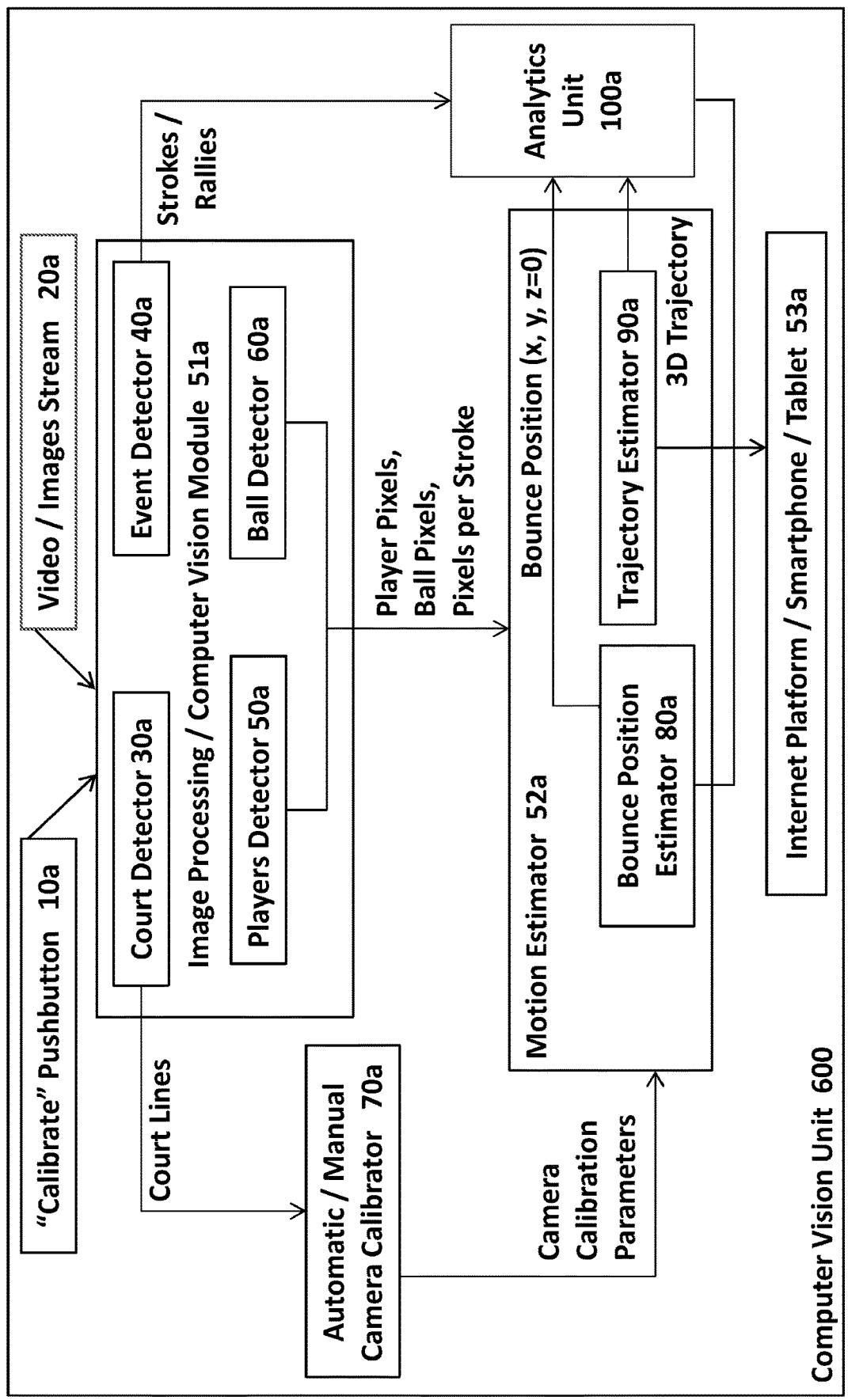
FIG. 6 is a schematic block-diagram illustration of a computer vision unit, in accordance with some demonstrative embodiments of the present invention.

Reference is made to FIG. 6, which is a schematic block-diagram illustration of a computer vision unit 600 (e.g., which may be an implementation of computer vision unit 120), in accordance with some demonstrative embodiments of the present invention. Some of the functionalities of such unit may comprise, for example image processing, motion estimation, generating analytics, communication with mobile and/or cloud-based and/or Internet-based and/or remote platform, and/or automatic calibration of the one or more cameras of the device. The arrows in FIG. 6 demonstrate non-limiting examples of flow of data as well as outputs and inputs.

Figure 7:
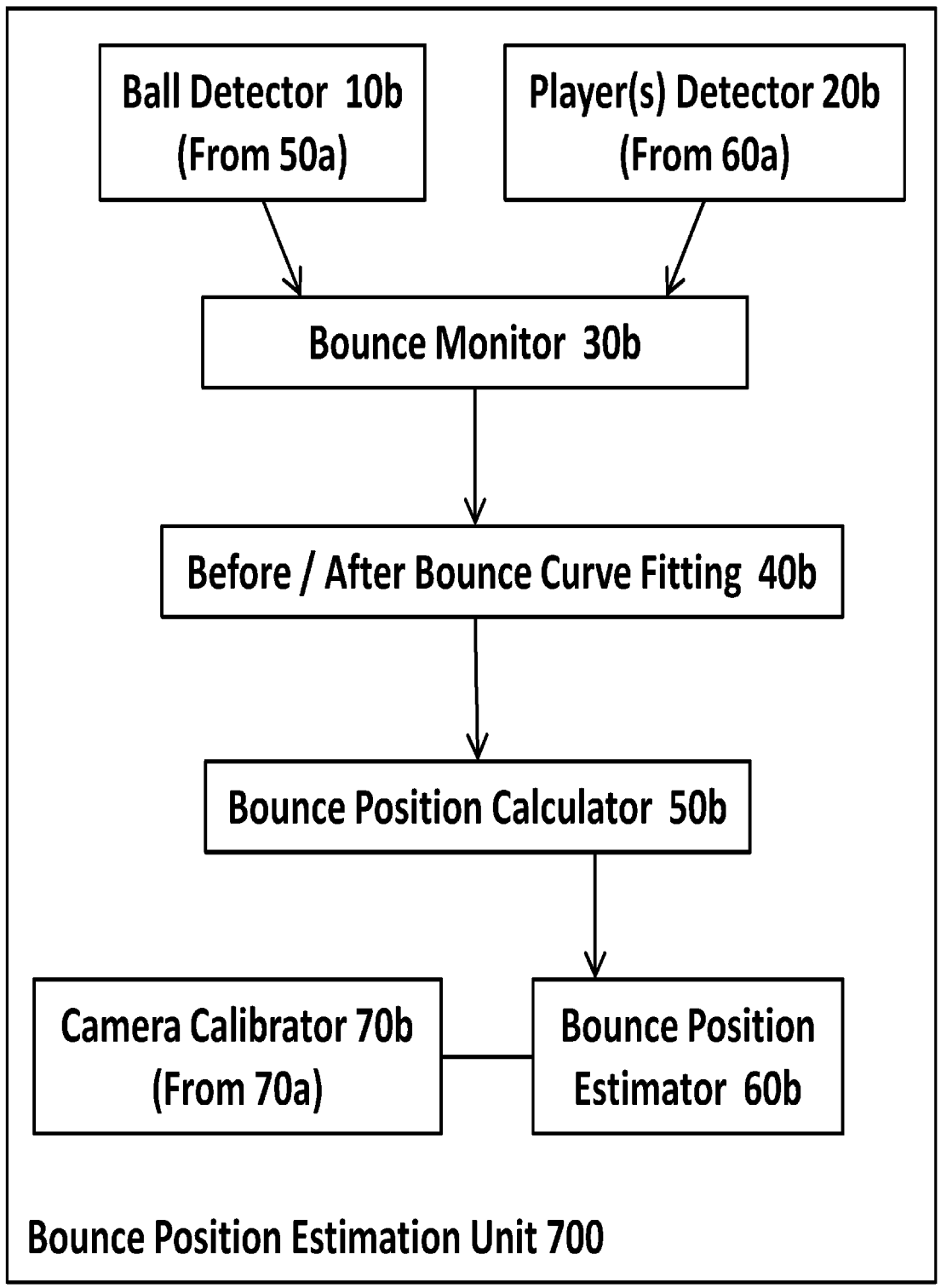
FIG. 7 is a schematic block-diagram illustration of a bounce position estimation unit, in accordance with some demonstrative embodiments of the present invention.
Figure 14:
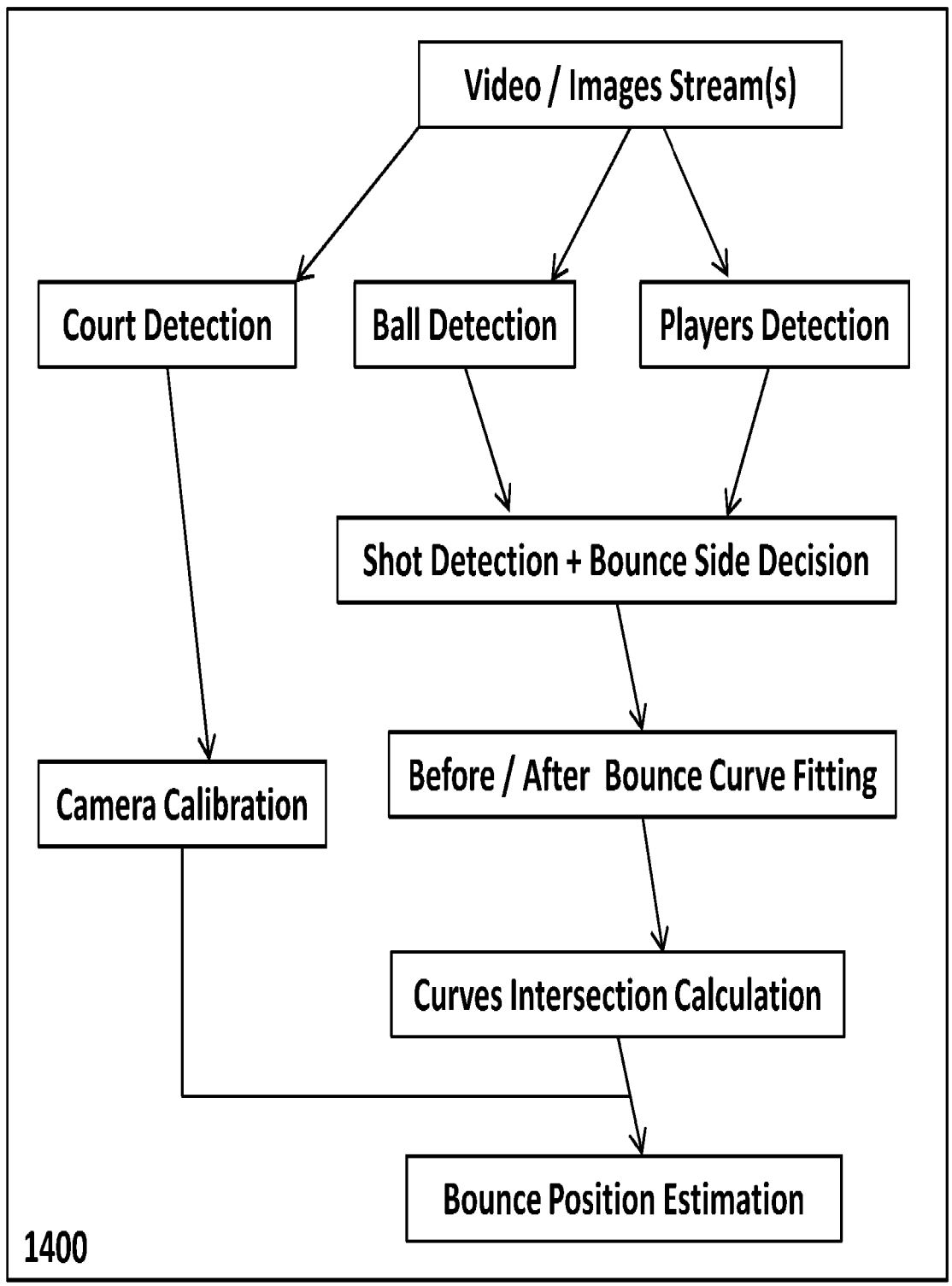
FIG. 14 is a schematic illustration of a process demonstrating bounce position estimation, in accordance with some demonstrative embodiments of the present invention.

Reference is made to FIG. 7, which is a schematic block-diagram illustration of a bounce position estimation unit 700, in accordance with some demonstrative embodiments of the present invention. This unit determines, using image analysis and computer vision-based measurements only, or using them yet combined with other tracking methods or determination methods, the position at which the ball hits the ground during a shot. Reference is also made to FIG. 14, which is a schematic illustration of a process 1400 demonstrating bounce position estimation, in accordance with some demonstrative embodiments of the present invention.

Figure 8:
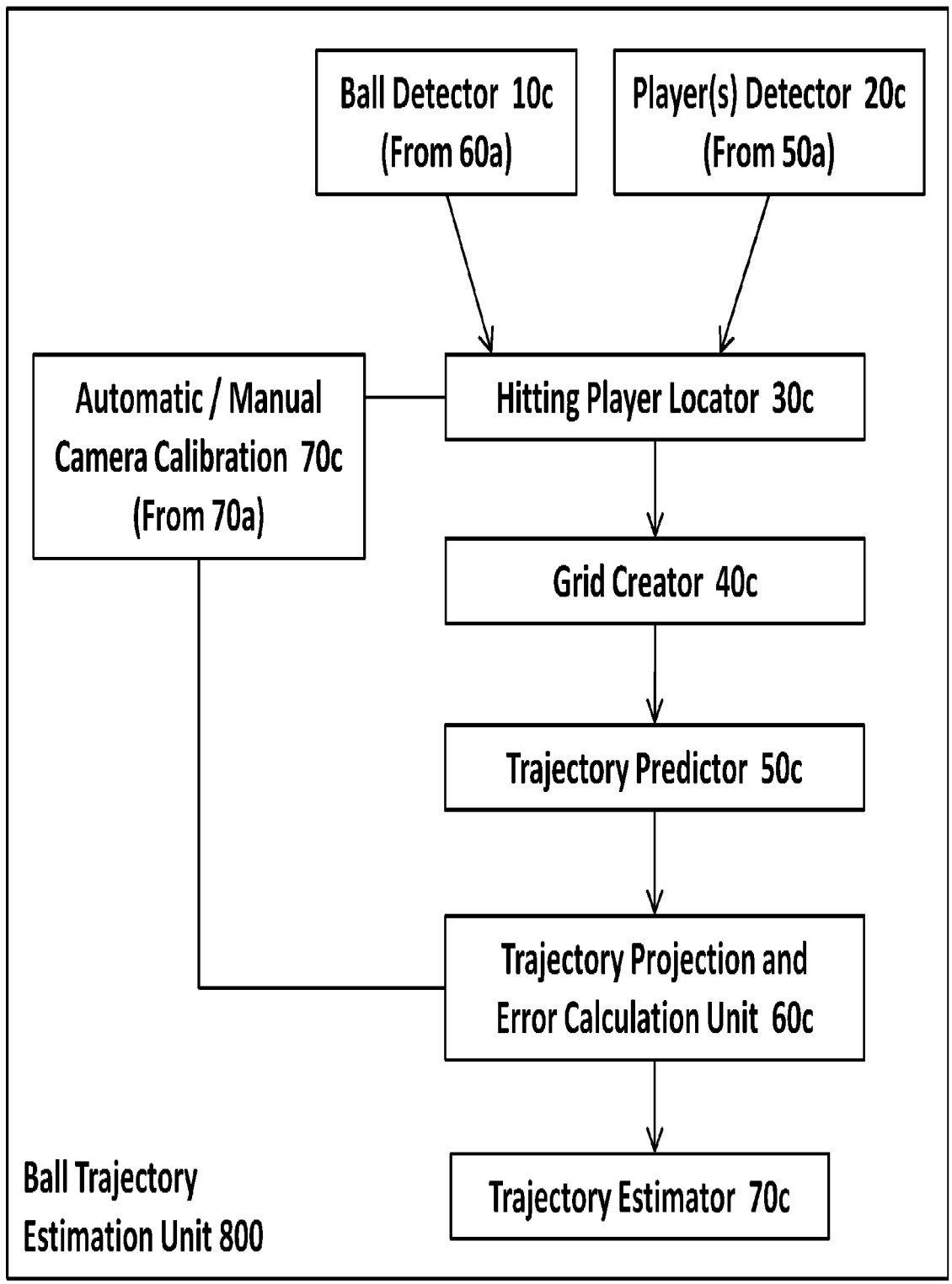
FIG. 8 is a schematic block-diagram illustration of a ball trajectory estimation unit, in accordance with some demonstrative embodiments of the present invention.

Reference is made to FIG. 8, which is a schematic block-diagram illustration of a ball three-dimensional (3D) trajectory estimation unit 800, in accordance with some demonstrative embodiments of the present invention. This unit calculates, using computer vision measurements and dynamic models, the three-dimensional trajectory and other parameters (for example: Speed, Acceleration, Spin, clearance of the ball over the net, total flight time, elevation, azimuth, rally length, height of the ball at the time of hitting, or the like) of a tennis ball during a shot or related to such ball or related to such shot.

Figure 9:
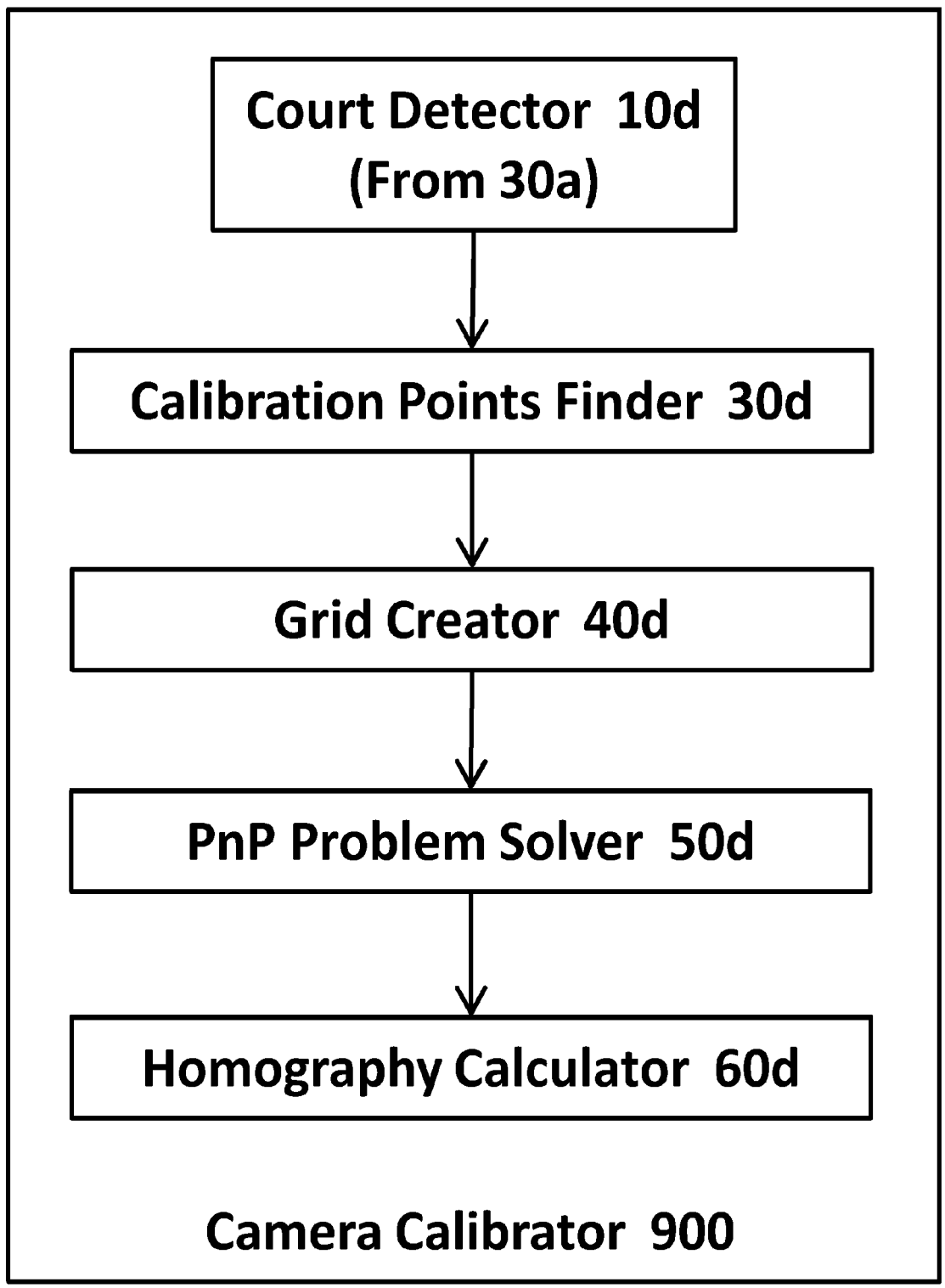
FIG. 9 is a schematic block-diagram illustration of a camera calibrator unit, in accordance with some demonstrative embodiments of the present invention.

Reference is made to FIG. 9, which is a schematic block-diagram illustration of an automatic camera calibrator unit 900, in accordance with some demonstrative embodiments of the present invention. This unit determines, using known or determined "landmarks" or intersection points on the tennis court, a homography matrix which maps the camera(s) frame plane to the court's plane.

Figure 10:
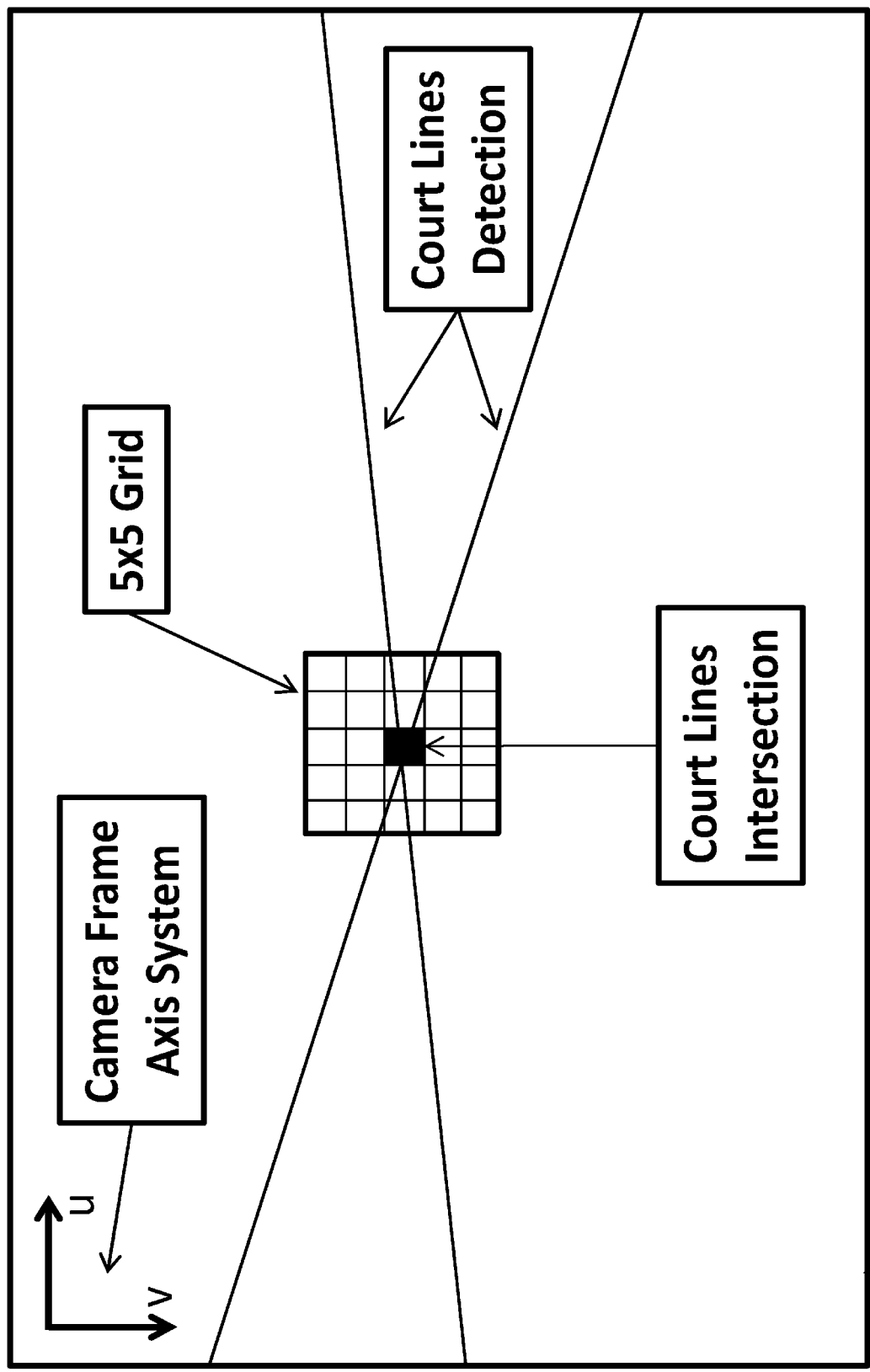
FIG. 10 is an illustration of an image, which may be captured by one or more of the cameras of the device or which may be constructed from two or more images captured by such camera(s), in accordance with some demonstrative embodiments of the present invention.

Reference is made to FIG. 10, which is an illustration of an image 1000, which may be captured by one or more of the cameras of device 100 or which may be constructed from two or more images captured by such camera(s), in accordance with some demonstrative embodiments of the present invention. For example, in some embodiments, the computer vision unit determines the intersection of two lines, in the captured image or frame. The two diagonal intersecting lines represent the lines detected by the Court Detector Unit or process. These two lines intersect at a particular pixel. The intersection pixel is located at the middle or center of a 5×5 pixel grid that is constructed around it by the system (or other suitable surrounding grid or matrix), which is further used for automatic camera calibration. Also demonstrated is the camera frames' axis system, at the top-left corner. Other suitable method may be used, in accordance with the present invention.

In other embodiments, the court lines finding may be based on other suitable methods or operations. For example, the Court Detector or other suitable unit or module (e.g., item 30a in FIG. 6) uses a color contrast-based detection (or recognition) algorithm to extract or to isolate the court lines from the background on (or within) the frame captured by the camera(s). Each line equation may be represented as: ax+by+c=0.

Each line that is detected or found or recognized in the image, corresponds to a line in the real-world court's coordinate axis; and the system of the present invention define them as corresponding lines.

For the purpose of Calibration, the lines on the real-world court's coordinate axis are either horizontal or vertical. The system operates to detect at least two vertical lines (out of two, baseline and service line) and two horizontal lines (out of five, side lines and center line).

Using at least four pairs of lines, the system determines or recovers the homography matrix by performing Direct Linear Transformation (DLT) using line correspondences. For example, Corresponding lines are related by:

$$l' = (H^{-1})^T l$$

where l and l' are the two corresponding lines, and H is the three-by-three homography matrix.

The above equation can be reorganized as:

$$M * H_{RS} = U$$

wherein, for the case of 4 pairs of lines, $$M_{4\ lines\ pairs} = \begin{bmatrix} a_1 & b_1 & 1 & 0 & 0 & 0 & a_1*a_1' & b_1*a_1' \\ 0 & 0 & 0 & a_1 & b_1 & 1 & a_1*b_1' & b_1*b_1' \\ a_2 & b_2 & 1 & 0 & 0 & 0 & a_2*a_2' & b_2*a_2' \\ 0 & 0 & 0 & a_2 & b_2 & 1 & a_2*b_2' & b_2*b_2' \\ a_3 & b_3 & 1 & 0 & 0 & 0 & a_3*a_3' & b_3*a_3' \\ 0 & 0 & 0 & a_3 & b_3 & 1 & a_3*b_3' & b_3*b_3' \\ a_4 & b_4 & 1 & 0 & 0 & 0 & a_4*a_4' & b_4*a_4' \\ 0 & 0 & 0 & a_4 & b_4 & 1 & a_4*b_4' & b_4*b_4' \end{bmatrix}$$

and $$u_{4\ lines\ pairs} = \begin{bmatrix} a_1' \\ b_1' \\ a_2' \\ b_2' \\ a_3' \\ b_3' \\ a_4' \\ b_4' \end{bmatrix}$$

and $$H_{RS} = \begin{bmatrix} h_{00} \\ h_{01} \\ h_{02} \\ h_{10} \\ h_{11} \\ h_{12} \\ h_{20} \\ h_{21} \end{bmatrix},$$

wherein ($a_i$, $b_i$, $c_i$) are the lines equations coefficients.

The system then uses a suitable numerical method to calculate the calibration vector $H_{RS}$, to build or construct or generate the homography matric H such that:

$$H = \begin{bmatrix} h_{00} & h_{01} & h_{02} \\ h_{10} & h_{11} & h_{12} \\ h_{20} & h_{21} & 1 \end{bmatrix}$$

In the case of a tennis court, the maximum number of corresponding lines that are detected or that can be detected is 7.

The system may then perform a calibration verification process, for example, by checking the scale of one or more H matrix entries.

The system may calculate the calibration error, for example, by re-projecting lines intersection back to the real-world and by comparing them with the known coordinates of the court's lines intersection in the real-world axis system.

Figure 13:
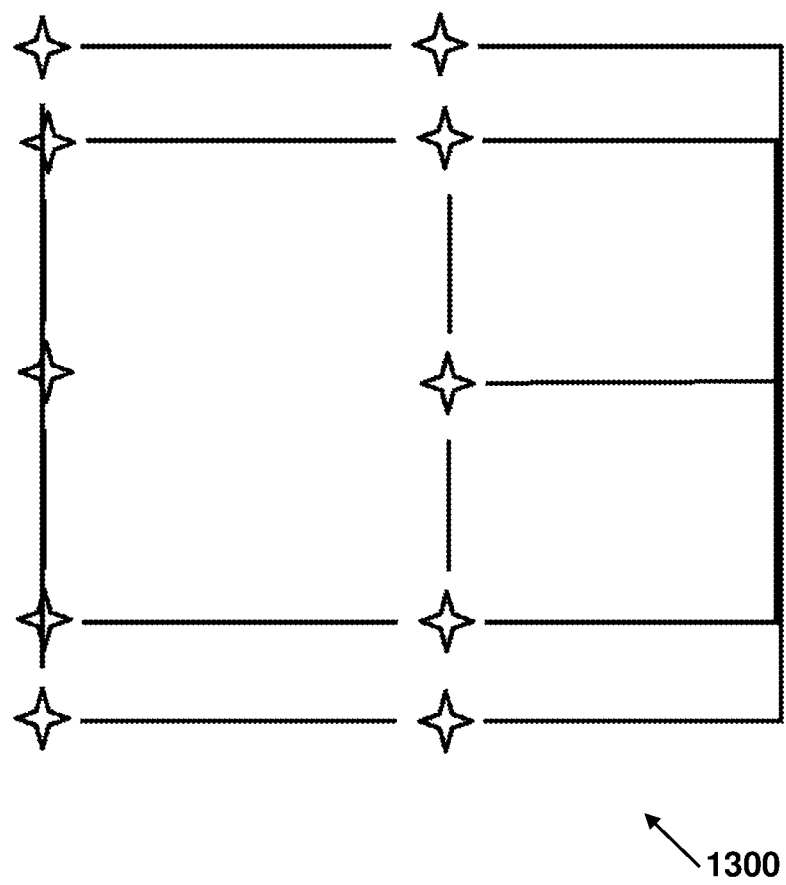
FIG. 13 is a schematic illustration of one half of a tennis court, showing the court lines and the ten intersections found, in accordance with some demonstrative embodiments of the present invention.

Using the homography matrix previously found and the known equations of the court's lines in the real-world axis system, the system may generate the lines in the image that were not used for calibration or were not found by court detector; thereby determining or locating ten line-intersections per each half-court. Reference is made to FIG. 13, which is a schematic illustration of a half-court 1300, showing the court lines and the ten intersections found, in accordance with some demonstrative embodiments of the present invention.

The system then converts those intersection points into court coordinate, using or based on the calibration. Then, for each pair of corresponding intersections points, the system may calculate the Euclidean distance, such as:

$$\text{error} = \sqrt{\sum_{i=1}^{n} |(X_i - X_i'\ \ Y_i - Y_i')|^2}$$

If one of the pairs distance is greater than a predefined threshold value, then the solution for H is discarded.

If a minimum of two horizontal lines and two vertical lines are not found, then the system tries again to find such lines by using different contrast-based parameters, up to a pre-defined number of iterations or times (e.g., up to 50 or 64 or 70 or 100 times). Otherwise, the system removes or discards different combinations of horizontal lines and re-iterate. If no combination of lines produces an acceptable solution in term of error magnitude, then the system may declare that the calibration has "failed".

Figure 11:
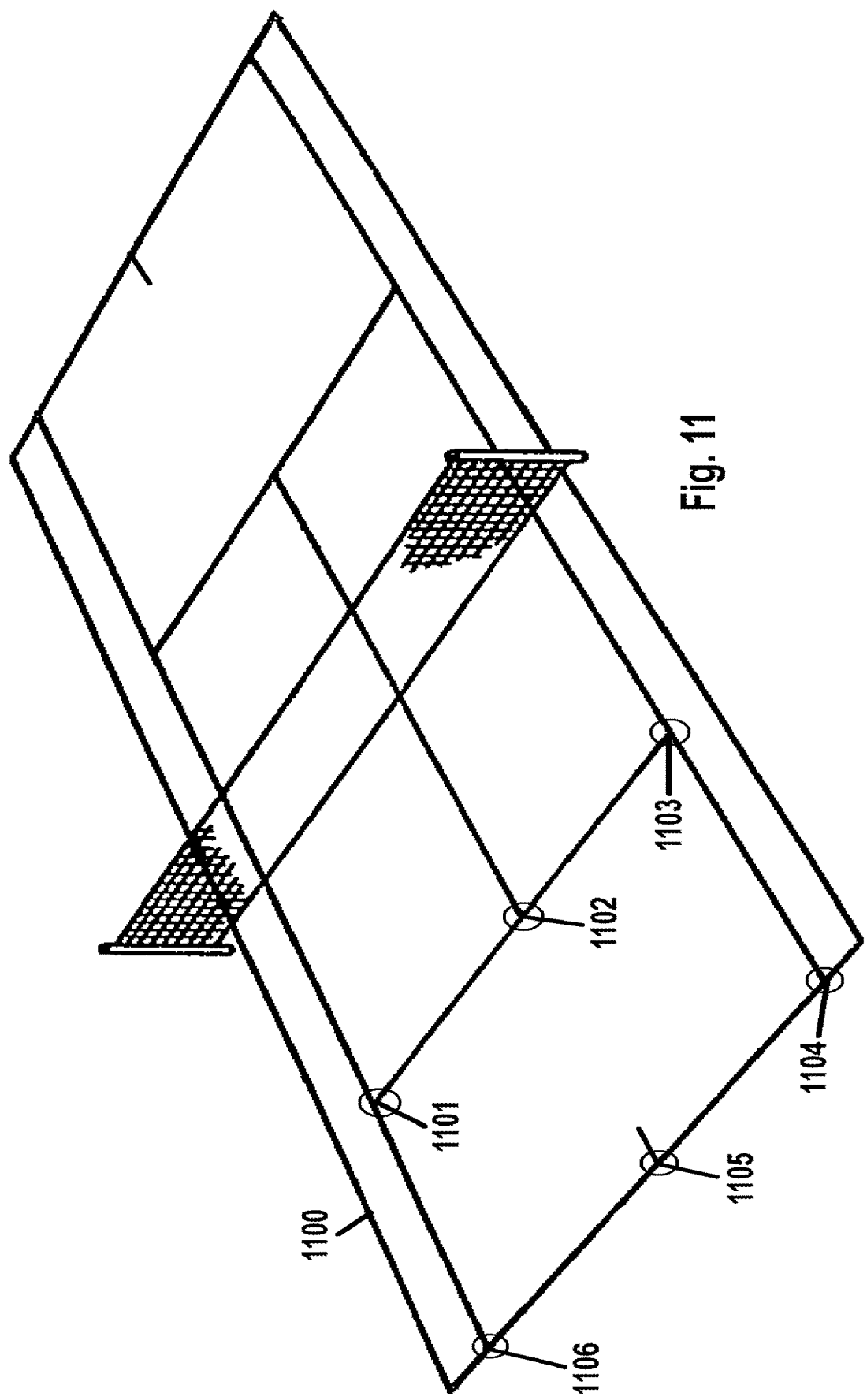
FIG. 11 is an illustration of an image of a tennis court, with six particular intersection points that are utilized for camera calibration and/or for computer-vision analysis, in accordance with some demonstrative embodiments of the present invention.

Reference is made to FIG. 11, which is an illustration of an image 1100 of a tennis court, with six particular inter-section points 1101-1106 that are utilized for automatic camera calibration, in accordance with some demonstrative embodiments of the present invention. These particular intersection points have known or determined coordinates in the court's axis system, and are detected in the captured frame(s) by the court detector unit or process.

Figure 12:
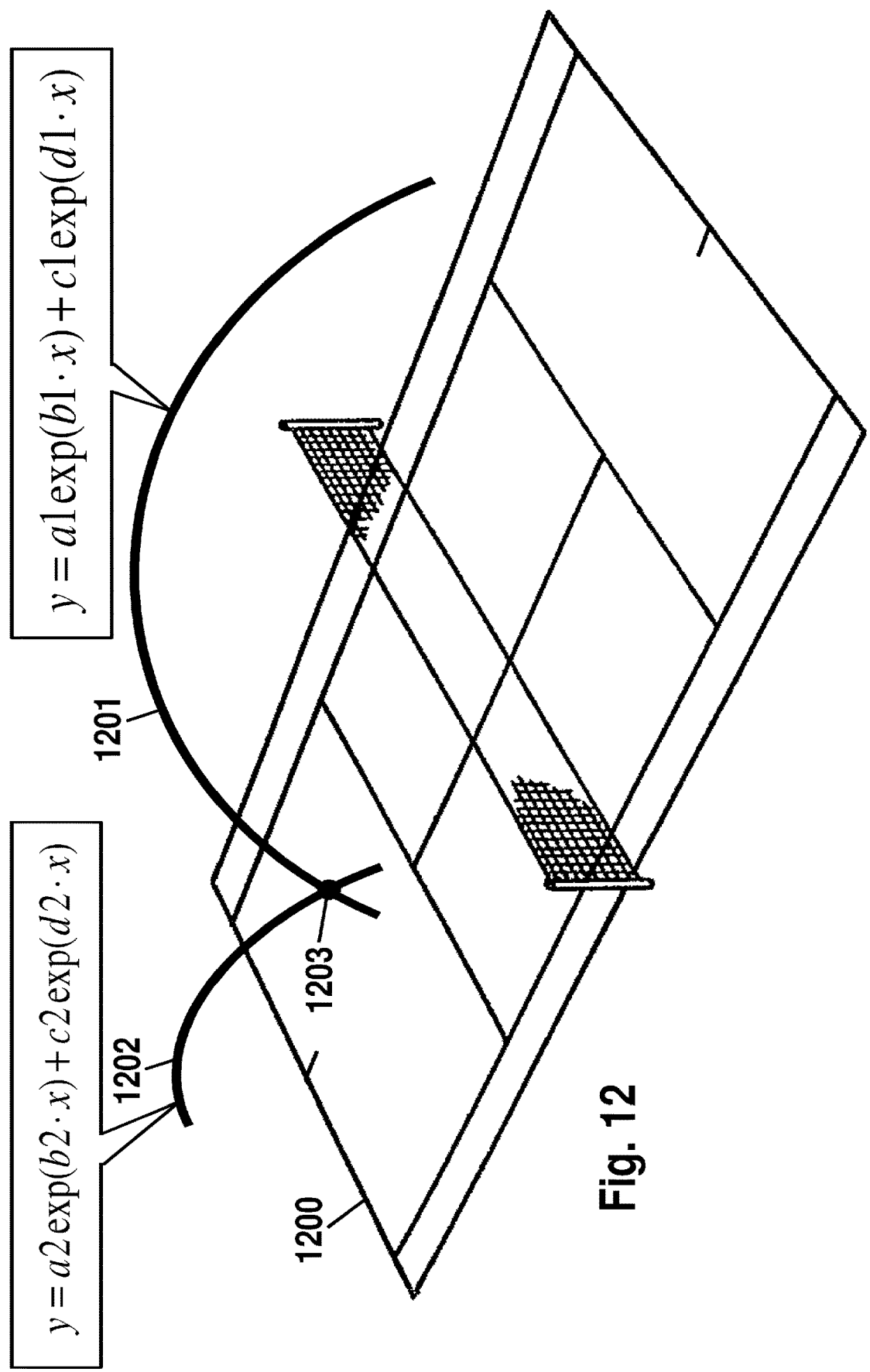
FIG. 12 is an illustration of an image or an image portion, demonstrating two fitted curves that are generated or determined, in accordance with some demonstrative embodiments of the present invention.

Reference is made to FIG. 12, which is an illustration of an image 1200 or an image portion, which may be captured by the camera(s) of device 100 and/or may be analyzed by the computer vision unit of device 100, demonstrating two fitted curves that may be generated or deduced or deter-mined by device 100 from (or based on) the ball locations as detected or identified in one frame or in multiple frames, in accordance with some demonstrative embodiments of the present invention. Particularly, a first fitted curve 1201 corresponds to the route of the ball before its impact with the ground; and a second fitted curve 1202 corresponds to the route of that ball after the ball's impact with the ground. The intersection 1203 of these two fitted curves may determine, and/or may help device 100 to determine, the ball bounce location in the imager's or camera(s) frame(s).

In accordance with some embodiments of the present invention, the shape of the ball or the change in the shape of the ball, as captured and identified in one or more frames or images, may be utilized by the system to automatically determine that a Bounce Event has occurred, and/or to detect a Bounce Event and/or its exact timing and/or its exact location (e.g., in an image, and/or in a real-life location of the tennis court which corresponds to that location in that image). For example, a tennis ball flying freely in the air may have a shape that is generally circular or round or spherical; whereas, a tennis ball that bounces on the ground may have, for a short period of time, an oval or elliptical or non-circular shape, due to the forces of impact and/or friction with the ground which may slightly squeeze the tennis ball as it hits the ground and is reflected upwardly and diagonally from the ground. Accordingly, the system and method of the present invention may utilize an analysis that takes into account the shape of the ball representation in captured images or frames, for one or more purposes, and particularly for detection of a Bounce Event and/or its properties and location and timing. For example, identifica-tion that the tennis ball's image has changed from circle to oval, may indicate (or, may support a computerized deci-sion) that an impact with the ground has occurred at the relevant frame(s); and/or that the impact took place at a particular speed or velocity (e.g., based on pre-defined threshold values or range-of-values); or may be used for other analysis purposes or for generating other determina-tions or insights.

Referring now again to FIG. 1 and FIG. 4, the device 100 may be installed or mounted or placed or connected on one side of the tennis court, typically at half-length of the tennis court, typically near (or on, or in proximity to) the net of the tennis court or the net post or the net frame or the net holding structure. The device 100 includes a single camera or imager (or, in some implementations, multiple cameras or multiple imagers which are co-located next to each other in the same housing), having adequate resolution (e.g., high definition (HD) or 4K or 8K; capable of capturing images or video at 24 or 30 or 60 or 90 or 120 frames per second (FPS)). The processor of device 100 performs one or more algorithms or programs or computer vision methods or image analysis methods, for accurate motion estimation or motion tracking of the tracked objects (e.g., tennis ball; tennis players).

In the demonstrative case of tennis, the accuracy of locating or determining the ball's 3D location, when per-formed automatically by the system of the present invention, especially at the impact of the tennis ball with the ground (and/or immediately before, and/or immediately after, such impact), may be important and/or useful. An important capability of the system of the present invention is the tracking and calculation of the 3D trajectory of the ball and players during the whole shot or the entire flight of the ball, since its initial hit by a racket of Player 1, until its subse-quent hit by a racket of Player 2, as this may enable the system to generate insights on the players' performance.

The Applicants have realized that conventional systems are imperfect, and are typically based on multiple fixed cameras that are mounted at two or more different locations (e.g., a first corner of the tennis court, and a second corner of the tennis court; or, a first camera located near the net, and another camera is located near a corner of the tennis court; or multiple cameras installed on multiple different locations along the fences surrounding a tennis court). Conventional systems typically have high installation and maintenance costs; they may require to perform changes in the tennis court's infrastructure; they are cumbersome and require installation and maintenance of multiple separate devices; they are therefore typically utilized only at high-end or professional venues.

In contrast, the system of the present invention may track and calculate 3D locations of objects (e.g., tennis ball, tennis players) by utilizing only a single camera or by utilizing only two co-located cameras that are mounted in or within a single device or a single housing having a small form-factor; thereby reducing the system's installation costs and main-tenance costs, and its form factor, as well as reducing the number of discrete components that should be utilized, installed and/or maintained.

An auto-calibration process of the present invention enables the device to be easily and quickly transferable from one tennis court to another tennis court, in an efficient and rapid manner, making the system accessible to virtually all types of tennis courts or sports venue, even non-professional venues or recreational venues that are utilized by amateur players; and to rapidly and efficiently deploy the device 100 in such tennis court, and to take device 100 away with him upon completion of his tennis practice session or his tennis match.

Device 100 may be used during a tennis match or and/during tennis practice. It may be utilized in a match or practice of Player 1 against Player 2; or in a match or practice of Players 1+2 against Players 3+4; or in a practice of a human Player 1 against an automated player or a machine or a robo-player (e.g., a machine that spits out or shoots out tennis balls towards Player 1); or in a practice of human Players 1+2 against one or more automated players or machines or robo-players; and/or in other suitable com-binations or scenarios, indoor, outdoor, in a clay court, grass court, hard-court, carpeted court, and/or other suitable courts.

In some embodiments, the system comprises a single camera device and a mobile software application (or "app" or mobile app) which may be installed on a personal mobile device or on an electronic device (e.g., smartphone, tablet, smartwatch, laptop computer). The two components may interface or may communicate with each other by wireless connection, such as over a Wi-Fi communication link, IEEE 802.11 communication link, a Wireless LAN or W-LAN, a cellular communication link, Bluetooth, Zigbee, or other suitable protocols; although wired link(s) and/or cable(s) and/or wires may also be used, instead of wireless communication or in addition to it.

In some embodiments, the device comprises one single camera, or several co-located cameras or adjacent cameras or neighboring cameras (or imagers) within the same housing or enclosure, and such camera(a) are connected (e.g., via a wired link and/or via a wireless link) to a processing unit (e.g., processor, CPU, controller, Integrated Circuit (IC), processing core), a battery (or other power source), and optionally an audio speaker or an audio output unit (e.g., optionally used by the system to output real-time arbitration results), as well as the other components shown in FIG. 1.

For example, the device is positioned on the side of the tennis court, on top of the net-post or net frame or other structure, at approximately half-length of the court, approximately aligned with the net of the tennis court; for example, as demonstrated in FIG. 3 and/or FIG. 4. The camera(s) of the device is (are) positioned and oriented in such a manner that the whole tennis court is included within the frame(s), or within the field-of-view of the single camera if there is a single camera, or within the combined fields-of-view of two or more cameras if two or more such cameras are utilized; as demonstrated also in FIG. 5 (e.g., with an overlapping imaging segment that is imaged by the co-located imagers).

The captured frames or images (or, video-frames, or video segments) are transferred (via a wired link or via a wireless link) for temporary storage in the memory unit and/or for long-term storage in the storage unit; and/or for analysis at the processing unit, which is responsible for receiving the images or video frames and run one or more image processing and/or motion estimation algorithms. FIG. 6 demonstrates the processing flow, in accordance with some demonstrative embodiments of the present invention.

For example, the captured frames or images or video-segment or video-stream are firstly processed for object detection; e.g., the processor detects the tennis player(s) and/or the ball, to the extent that they appear in each frame or frames or set-of-frames. In order to detect the relevant ball in the incoming frame or in the current frame (e.g., item 20*a* in FIG. 6), the current frame (or, at least a sub-region thereof) is compared to the previous frame(s) (e.g., to the most recent frame; or to one or more of the most-recent N frames; or to a sub-region of the most-recent frame; or to a sub-region of a previous frame), in order to extract and/or ignore and/or discard background features and/or other image-portions or frame-portions that are neither the tennis ball nor the tennis players (and in some implementations, neither the lines that indicate the borders or edges of the tennis court). Optionally, dilution and/or erosion filters are applied to one or more of the frames, such as to the current frame being analyzed and/or to previously-captured frames, in order to further isolate or distinguish or differentiate dynamic objects (e.g., ball, player) from static objects (e.g., court borders; chair or stand of the chair umpire; referee stand; the net; a banner advertisement in the background; or the like). A search is performed in such image(s) or frame(s), to identify blobs and/or contours which fit or match (or correspond to) the ball's shape or are generally similar (or identical) to a ball shape, by contour (e.g., sphere or circle or oval), by color (e.g., yellow color as typical color of tennis ball, and/or other criteria; and tracking is subsequently performed by reducing or cutting or cropping the search area or frame-region, using one or more parameters such as, for example, a ballistic motion model (e.g., since a tennis ball may travel, typically, at a route that generally corresponds to a ballistic motion, optionally ignoring or taking into account wind effect or air friction), the size of the blob or image-region being searched, solidity of one or more items and/or regions in the frame, color and/or brightness and/or contrast and/or hue and/or saturation and/or other particular properties of one or more detected items and/or of the image-region being analyzed.

In some embodiments, optionally, the system may utilize an initial calibration process or initial optimization process or initial recognition process, in which the device 100 captures a single still image or static image of an up-close image of the particular tennis ball that would be in use, and then utilizes it for subsequent object tracking. For example, a tennis player may utilize a tennis ball having a distinct or unique color, such as bright orange or pink, or having a unique marker or pattern or spots or logo or pattern. The player may initially present and show this particular ball that is about to be used, to the camera(s) of the device during a calibration stage, and may push or press a button to convey to device 100 that the player is now presenting the tennis ball for image acquisition purposes and for calibration purposes; such that the camera(s) of the device 100 then acquires a static image of the ball at idle state from a short distance (e.g., 30 or 50 centimeters away); and can then utilize that particular image subsequently to track this particular tennis ball across images or frames based on the particular color and/or characteristics shown in the initial calibration photo. For example, the processor or an analysis unit of device 100 may analyze the static calibration image of the tennis ball; may extract from it the particular visual characteristics of this specific tennis ball (e.g., color of ball; color of logo printed on the ball; shape or content of the logo printed on the ball; or the like). The extracted visual characteristics of this specific tennis ball may then be searched, found, and tracked in subsequent images or frames or videos during the tennis practice or the tennis match itself. This process may increase or improve the accuracy of the ball tracking, in some implementations; particularly if the tennis ball has a unique color or logo, and/or if the tennis court has a color that is generally similar to the ball color (e.g., a combination of a light colored tennis court with a light colored ball). Additionally or alternatively, in some embodiments, optionally, the system may utilize an initial calibration process or initial optimization process or initial recognition process, in which the device 100 captures a single still image or static image of an up-close image of the particular surface of the tennis court that would be in use, and then utilizes it for subsequent object tracking. For example, a tennis player may intend to play tennis at a tennis court having a distinct or unique color, such as gray or grey, or yellow, or light orange, or green, or red, or blue; or having a unique pattern or spots or texture (e.g., a tennis court made of asphalt having a grainy surface). The player may initially present and show a small segment or small portion of this particular tennis court, that is about to be used, to the camera(s) of the device during a calibration stage, and may push or press a button to convey to device 100 that the player is now aiming the device 100 to capture a static image of the general surface of this tennis court from a short distance (e.g., from 1 or 2 meters away), for image acquisition purposes and for calibration purposes; such that the camera(s) of the device 100 then acquires a static, direct, unobscured image of the portion of the tennis court from a short distance (e.g., 1 or 2 meters away; without a tennis ball and/or without a human player appearing in such calibration image); and can then utilize that particular image subsequently to assist in tracking the tennis ball across images or frames based on the particular color and/or characteristics of the tennis court shown in the initial calibration photo. For example, the processor or an analysis unit of device 100 may analyze the static calibration image of the tennis court surface-portion; may extract from it the particular visual characteristics of this specific tennis court surface (e.g., surface color; surface granularity or grains; or the like). The extracted visual characteristics of this specific tennis court may then be searched, found, and tracked (or conversely, may be discarded as non-ball/non-player features) in subsequent images or frames or videos during the tennis practice or the tennis match itself. This process may increase or improve the accuracy of the ball tracking and/or player tracking, in some implementations; particularly if the tennis court has a color or features that are generally similar or somewhat similar to those of the tennis ball and/or to those of the human players involved (e.g., a combination of a light colored tennis court with a light colored ball; or, a combination of red-colored tennis court with a human player wearing a red shirt).

Additionally or alternatively, in some embodiments, optionally, the system may utilize an initial calibration process or initial optimization process or initial recognition process, in which the device 100 captures a single still image or static image of an up-close image of a particular surface of the tennis court which includes a border line, and then utilizes it for subsequent object tracking. For example, a tennis player may intend to play tennis at a tennis court which has border lines having a distinct or unique color, such as yellow or off-white, or black (e.g., an indoor tennis court having a yellow surface and black border lines), such colors being intentionally unique or such color being different than conventional colors due to various circumstances (e.g., fading of an original white border line into a gray border line due to wear-and-tear or due to weather conditions), or border lines having a unique pattern or spots or texture (e.g., a tennis court made of asphalt such that the border lines might have a grainy surface). The player may initially present and show a small segment or small portion of this particular tennis court having therein the border line, that is about to be used, to the camera(s) of the device during a calibration stage, and may push or press a button to convey to device 100 that the player is now aiming the device 100 to capture a static image of the general surface of this tennis court with a border line therein, from a short distance (e.g., from 1 or 2 meters away), for image acquisition purposes and for calibration purposes; such that the camera(s) of the device 100 then acquires a static, direct, unobscured image of the portion of the tennis court with the border line, from a short distance (e.g., 1 or 2 meters away; without a tennis ball and/or without a human player appearing in such calibration image); and can then utilize that particular image subsequently to assist in tracking the tennis ball across images or frames based on the particular color and/or characteristics of the border lines shown in the initial calibration photo. For example, the processor or an analysis unit of device 100 may analyze the static calibration image of the tennis court border line; may extract from it the particular visual characteristics of this specific border line of this tennis court (e.g., color; surface granularity or grains; or the like). The extracted visual characteristics of the border lines of this specific tennis court may then be searched, found, and tracked (or conversely, may be discarded as non-ball/non-player features) in subsequent images or frames or videos during the tennis practice or the tennis match itself. This process may increase or improve the accuracy of the ball tracking and/or player tracking, in some implementations; particularly if the border lines of tennis court have a distinct color or features, or are faded or semi-faded, or are significantly different from conventional color schemes of tennis courts, or are somewhat similar to those of the tennis ball and/or to those of the human players involved (e.g., a combination of light colored border lines of the tennis court, with a light colored ball; or, a combination of red-colored border lines on the tennis court, with a human player wearing a red shirt).

Additionally or alternatively, in some embodiments, optionally, the system may utilize an initial calibration process or initial optimization process or initial recognition process, in which the device 100 captures a single still image or static image and/or an up-close image of a particular human player, and then utilizes it for subsequent object tracking. For example, tennis Players A and B may intend to play tennis at a particular tennis court; they notice that the tennis court surface is gray, that the tennis ball is yellow, that Player A wears a gray shirt, and that Player B wears a yellow shirt. The players may initially present and show to device 100 the entire figure of each one of the players, from a short distance (e.g., 2 meters away), during a calibration stage, and may push or press a button to convey to device 100 that a player is now showing himself to device 100 to capture a static image of the player from a short distance (e.g., from 2 meters away), for image acquisition purposes and for calibration or recognition or optimization purposes; such that the camera(s) of device 100 then acquires a static, direct, unobscured image of the player (e.g., his entire body; or at least his shirt/chest area, or the upper-half of his body), optionally without having a tennis ball shown in this calibration image; and can then utilize that particular image subsequently to assist in tracking the tennis ball and/or the human player(s) across images or frames and/or determine which of Players A or B stands on the right side of the court and which of Players A or B stands on the left side of the court, based on the particular color and/or characteristics of the human player(s) shown in the initial calibration photo. For example, the processor or an analysis unit of device 100 may analyze the initial static image of the human player (or, may process multiple such photos of multiple such players that participate, having their images captured in series, one after the other, with indications between them that the next photo is another photo of another human player); may extract from it the particular visual characteristics of these human players (e.g., shirt color; pants color; skirt color; shoes color; skin color; existence or lack of accessories such as hat or cap or head-band or wrist-watch; hair color; hair length or even hair style which may assist in distinguishing between two human players that play on the same side against a pair of other players; a unique pattern or name or logo or number that appears on a clothing article of a particular player; or the like). The extracted visual characteristics of the player may then be searched, found, and tracked (or conversely, may be discarded as non-ball features) in subsequent images or frames or videos during the tennis practice or the tennis match itself; or may be otherwise used in order to differentiate between a human player and the tennis court and/or the tennis ball and/or the border lines of the court; and/or may be used to differentiate between Player A and Player B; or the like. Optionally, a similar initial recognition process or initial optimization process or initial calibration process may be performed with regard to a particular tennis racket used by one of the players, in order to improve its subsequent tracking and/or in order to assist in distinguishing among particular human players based on racket features. This process, which utilizes initial recognition or initial optimization or initial calibration based on images of the human players, may increase or improve the accuracy of the ball tracking and/or player tracking, in some implementations; particularly if the human players wear clothes having unique or distinct colors, or conversely if a human player wears a clothing article having a color that is generally similar to the color of the tennis ball and/or the tennis court and/or the border lines and/or the clothing article(s) of another player.

In some embodiments, a tennis ball may be detected and tracked by the system of the present invention based on pre-defined rules or criteria. For example, in a demonstrative example out of many other possible examples, the tennis court itself is pre-defined in a particular implementation as having green color or orange color or gray color; the players are identified as being pre-defined to be having pink body-parts and blue clothes; the border lines that define the tennis court are pre-defined as white; the umpire stand or the referee stand is pre-defined to be black or gray; and a circular or oval object, having a distinct yellow color, is detected to be travelling from east to west (or, from right to left) and changing its location or relative location in a series of frames along a travel route that is generally similar to a parabola or a ballistic route model; thereby enabling the system to determine that this particular object is the tennis ball. In other embodiments, the tracking may be based on, or may be facilitated or improved by, or may take into account, the particular features (e.g., colors, texture) of the ball and/or court and/or players and/or border lines, as extracted from initial calibration images of these objects. Other suitable tracking methods or definitions may be used in accordance with the present invention.

Player(s) detection (e.g., item 50a in FIG. 6) is performed, for example, using a neural network (NN) or other machine learning (ML) unit or deep learning (DL) unit or artificial intelligence (AI) unit or computer vision unit, which is trained or pre-trained for human shape recognition or for computer vision recognition of a human body or a human figure within a captured frame or image or portion thereof. The initial search is performed on a whole entire frame or on a pre-defined part of the frame, or on an entirety or on a pre-defined part of several frames; the search area is then, optionally, reduced according to pervious frame(s) detection, based on heuristic thresholds or Kalman-Filter predictions. For example, in some embodiments, computer vision analysis of image number 143 yields that a first human player is determined to be located at a far-right side of the tennis court, externally to the border lines of the tennis court; therefore, when analyzing image number 144, the system may automatically decide to analyze via computer vision only the right-most one-third of image number 144 (and/or to discard or ignore the left-most two-thirds of image number 144, for computer vision analysis purposes; and/or to discard or ignore other particular portions of image number 144), rather than the entirety of image number 144, since the system may utilize an assumption or a rule that it is impossible for a tennis player to appear at an offset of 8 (or more) meters in two consecutive images, which were acquired 33 milliseconds apart. Similarly, an "area of interest" may be dynamically calculated, defined and then used, from one image to the subsequent image, having a particular radius or distance relative to a previously-detected object (ball or player); thereby improving the speed and/or accuracy of object tracking, as well as reducing potential tracking errors.

In some implementations, out-of-scale candidates are rejected or discarded to avoid registration of unrelated persons as players; for example, tracking a tennis ball having a generally fixed size across frames 121 through 128, and then in frame 129 detecting a tennis ball which appears to be ¼ of the size of the previous fixed size, thereby indicating to the system that this may be another object and not a tennis ball, or that this may be a tennis ball that is actually in use at a different tennis court that is located behind the tracked tennis court and thus it appears smaller; or, for example, discarding image-information that is determined to be non-player(s), such as a spectator, a referee or umpire or chair umpire or line umpire, a ball-boy, a tennis player that is actually located at a different tennis court and is thus smaller in size, or the like, based on one or more criteria or rules (e.g., as a non-limiting example, in some embodiments the referee or umpire is identified or recognized by the system as generally located in a fixed location above a referee stand or an umpire stand with ladder or stairs, which a computer-vision unit can recognize in images or video frames; a spectator is discarded based on identification of the fact that he or she is holding an umbrella or drinking from a cup; or other suitable criteria which may be utilized by a computer-vision module to recognize objects or items within images or frames).

The event detection process of the present invention (e.g., item 40a in FIG. 6) is responsible for differentiating or distinguishing one tennis shot from another tennis shot (e.g., to differentiate between a first event in which Player 1 hits the tennis ball west-bound and the ball travels from east to west, and a second event in which Player 2 hits back the tennis ball east-bound and the tennis ball travels from west to east), particularly for image analysis and/or video editing purposes. This is performed, for example, by monitoring the tracked position of the ball in the camera(s) frames, and searching for sudden or abrupt or on-the-spot or non-gradual changes of direction (e.g., abrupt change from travelling westbound to travelling eastbound), and/or abrupt change in speed or velocity of travel (e.g., abrupt change from traveling westbound at 40 miles per hour due to a tennis serve, to traveling eastbound at 20 miles per hour due to a weak or weaker response shot), and/or searching for time delays between tracking instances and/or large differences between one tracked position to the next one. For example, if a tennis ball is identified as being located at the left side of frame number 7, and is next or subsequently located (in frame number 8, on in non-consecutive frame number 13) at the right side of a subsequent frame (consecutive, or non-consecutive), a "new shot" alert is generated or triggered. This allows the system's analytics layer (e.g., item 100a in FIG. 6) to store the event related information (e.g., speeds, directions, spin rates, winners, number of shots taken by each player separately and by the multiple players combined, and/or other data) for statistics and/or feedback.

Additionally or alternatively, such events and/or detection operations may be utilized for other purposes; such as, to re-confirm a previously-made detection, or to increase the certainty level associated with a previous detection; or conversely, to deny or cancel (or to reduce the level of certainty) of a previously-made detection that derived from previous image(s). For example, if the system incorrectly identified a traveling yellow object as a bird and not as a tennis ball, an abrupt on-the-spot change of direction from traveling west to traveling east may cause the system to re-classify or to modify its previous classification of that item, from being a "bird" to being a "tennis ball".

In some embodiments, the ball's location and/or the players' locations are produced as interim output, and are then utilized as input for shots analysis and/or for determining a shot-event, and/or for denying a shot-event, and/or for reducing or increasing the certainty level that a particular set of frames corresponds to a single shot event.

For example, in a demonstrative and non-limiting example, an initial analysis of 30 or 90 frames or images may indicate to the system as if the tennis ball was shot back by Player 2 towards Player 1, due to an abrupt change in direction and/or speed of the item estimated by the computer vision unit to be the tennis ball in that set of frames; however, in this demonstrative example, the system also identifies that Player 2 is located at least K pixels away (e.g., at least 100 or 400 pixels away, or other suitable threshold value) from the point in the set of frames in which the abrupt change is estimated to have occurred; thereby denying the conclusion that this was a single shot event which ended with Player 2 responding to the tennis ball's travel towards him, since Player 2 was identified by the computer-vision module of the system to be located sufficiently distanced away from the relevant point or at a particular offset from such location in the image; and this may lead the system to re-evaluate and/or correct and/or modify and/or replace and/or fine-tune its prior determinations or detections, with regard to the location and route of the tennis ball, and/or with regard to whether or not an event (e.g., a bounce, a shot, a response, a serve, or the like) had indeed occurred, in view of information that the system later gathered and analyzed with regard to the tennis players and/or with regard to other objects being tracked or identified; or may enable the system to modify or decrease or increase the level of certainty that it has attributed to a particular computer-vision conclusion or estimation in view of the information extracted from subsequent images which re-confirm or re-assure the previous detections or tracking, or which (conversely) deny or reduce the likelihood of correctness of such previous detections or tracking. The system of the present invention may thus feature and utilize a dynamic re-evaluation or re-analysis of previously-analyzed images or frames or video footage, based on fresh analysis of subsequent images or frames or video footage that contradicts and/or that re-affirms the analysis results of the previous frames or images or video footage; thereby providing a self-learning and self-improving computer vision unit that auto-corrects or auto-modifies its prior findings in view of subsequent newly-analyzed frames or images or footage.

In another demonstrative example, if the system detects via computer vision analysis no abrupt change in the general direction of the item which estimated to be the tennis ball, for a certain number of frames and/or for a particular time period after the ball bounce is detected (e.g., for 10 or 20 frames, and/or for 1 or 1.6 or 2 seconds after the bounce event), or if the systems detects that the ball has bounced on the ground twice or more, then the system may conclude that the shot event is over.

Other suitable methods, parameters and/or conditions may be used by the computer-vision analysis module(s) of the system in order to determine or to estimate a commencement of a shot event, an ending of a shot event, or an intermediate portion of a shot event.

The tennis game real-time analysis of the present invention may optionally include ball bounce position estimation (e.g., item 80a in FIG. 6), thereby allowing Bounce Event detection, which may be enable generating insightful statistics. The bounce location estimation algorithm is described herein in greater detail.

The system of the present invention may perform estimation of a tennis ball's 3D-trajectory during a shot or during a sequence of frames that corresponds to a single shot-event (e.g., item 90a in FIG. 6), namely the 3D-location of the ball at every time-step (or frame) during a shot or during a shot-event. This optimization process may utilize three (or more) sources of information, for example: (1) The hitting player's location on the court, (2) the ball's coordinates in the camera(s) frame, and (3) a mathematical or physical or geometric or other model of the ball's flight from the hitting player's racquet to the bouncing point. This allows the system to perform further analysis of the players performance, such as the speed of the ball, the spin rate, the net clearance (the height at which the ball passes above the court's net), and/or other analysis results.

Some embodiments of the present invention perform translating of visual information (e.g., pixels or pixel data in captured frames) to real-world information (e.g. determination of the three dimensional location or spatial location or real-world location, for example, in the tennis court's axis system, of a specific feature or object that is detected or identified or recognized or tracked in one or more frames or images captured by the imager(s) or camera(s)), based on knowing or determining or identifying the relation (e.g., mathematical relation, or other matching criteria or correlation criteria) between the two. Given the intended use of the system, flexibility and low-maintenance may be important properties in some implementations; and therefore, a calibration process or task may be done automatically by the system in order to enable or to facilitate subsequent object-tracking and localization operations. The process includes, for example, detecting in the camera(s) frame(s) multiple points on the tennis court, which (X, Y, Z) components are known, and recording their coordinates in the camera(s) coordinates system (u, v). Then, the relation or correlation or mathematical relation between (i) pixels coordinates in the camera(s) frame (u, v) (e.g., as in FIG. 10) and (ii) their corresponding 3D point in the court's 3D coordinates system (X, Y, Z), as demonstrated in FIG. 3, is found through an optimization process and/or through an image-search process.

Some embodiments of the present invention may comprise or may utilize the following automated method or computer-vision based process for Ball Bounce Position Estimation.

The Applicants have realized that accurate estimation of a ball bounce location on the ground may be of importance for multiple sports fields; and, in Tennis particularly, correctly analyzing ball bounce locations over time for a specific player may allow to generate statistics and insights such as a "heat map" of shots placements distribution, as well as average hitting depth, which provides important insights on the player's performance and enables the player to focus on particular practice regimes.

In some embodiments, the Ball Detector (e.g., item 60a in FIG. 6) reduces the ball object to (or, replaces the entirety of the ball object with) one representative pixel, whose coordinates (u,v) in the camera(s) axis system (e.g., FIG. 3) are transferred as input to the ball Bounce Position Estimation process or unit (e.g., item 80a in FIG. 6), for each frame or for at least one frame or for at least a set of frames being analyzed. For example, the one representative pixel of the entire ball object, is generated by finding the average (or the median) of all the "u" (horizontal) values of all the pixels that correspond to the ball object, and by finding the average (or the median) of all the "v" (vertical) values of all the pixels that correspond to the ball object; and the average (or the median) values of all such "u" and "v" value are utilized as the "single representative pixel" of the entire ball object.

Furthermore, the "v" component (height of the ball; vertical component) of the single pixel (u,v) ball coordinates in the frame's axis system (e.g., demonstrated in FIG. 10) is monitored and/or tracked and/or followed in (or by) the Bounce Monitor (item 30b in FIG. 7), which identifies or determines the closest frame relative to the bounce event. The frame number of that frame (which is closest to the bounce event) and the pixel coordinates representing the ball object at that particular frame are denoted as (Umin, Vmin), and are stored by the system.

The dataset or the frame-set is reduced or redacted or purged to leave only 8 to 16 (or, 10 to 15) frames in total, if available for a specific shot event, spanning frames before and after the bounce event itself; and the reduced dataset is saved in the Bounce Monitor (e.g., item 30b in FIG. 7) and may be split into two subsets: a "before bounce" subset of frames, and an "after bounce" subset of frames.

Each of the two sub-datasets are fitted to its own curve, as demonstrated in FIG. 12 (e.g., its own ballistic route model), such as by utilizing the following equation or other suitable algorithm that matches between a data-set and a representation of a curved travel route or ballistic model;

$$y = a\ \exp(b \cdot x) + c\ \exp(d \cdot x)$$

Optionally, for example, an unconstrained nonlinear optimization process may be utilized for the above.

The Curve Fitting process (item 40b in FIG. 7) may be repeated with the pixel coordinates (Umin, Vmin) stored in the bounce monitor (item 30b in FIG. 7) as part of each of the subsets "before bounce" and "after bounce". The fitting solution which yields the minimum error is chosen for further processing and utilization.

The intersection of the two fitted curves (e.g., as demonstrated in FIG. 12) is determined or is calculated numerically by the system's Bounce Position Calculator (e.g., item 50b in FIG. 7) to yield the bounce pixel coordinates (Ubounce, Vbounce) in the camera image axis system (e.g., of FIG. 3).

A homographic calibration matrix is calculated in the Automatic Camera Calibrator (e.g., item 70a in FIG. 6), and is used to convert the pixel coordinates of the bounce location (Ubounce, Vbounce) at the Bounce Position Calculator (e.g., item 50b in FIG. 7) to the bounce coordinates (Xbounce, Ybounce, wherein Zbounce=0) in the tennis court's axis system (e.g., demonstrated in FIG. 3).

In some embodiments of the present invention, two or more cameras or two or more imagers are co-located in the same housing or next to each other, such that the distance between the imagers is not more than D centimeters; where D is, for example, 30 centimeters, or one foot (30.48 centimeters), or 25 or 20 or 15 or 12 or 10 or 8 or 5 or 3 or 2 centimeters, or 1 centimeter; or even co-located cameras which are touching each other. In some embodiments, the two or more co-located imagers or cameras, capture together a combined field-of-view that is as large as the full length of a conventional tennis court, which is 78 feet long (23.77 meters). Accordingly, if the distance between the two or more imagers is (for example) up to one foot, and the size of the longest dimension of the tennis court is 78 foot, the distance between the imagers, in some embodiments of the present invention, is not more than one foot, or is not more than 1/78 of the longest dimension of the area that is covered by the combined field-of-view of the two imagers together.

Some embodiments may perform 3D Ball Trajectory Estimation, based on images or video captured by a single viewpoint or single device, or from a single camera or imager, or from two (or more) co-located imagers that are in proximity to each other within the same housing. For example, in various Sports fields and in Tennis in particular, players' performance analysis is based on diverse metrics extracted from the motion of the ball in play; such metrics may comprise, for example: Ball Speed; Ball Spin Rate; Ball Azimuth and Elevation; Ball Height.

The calculation of the 3D ball trajectory, e.g., the three-dimensional (X, Y, Z) position of the ball in the court's axis system (e.g., demonstrated in FIG. 3), may be determined and/or utilized for every time step or for every captured frame, or for a set of frames grouped together. For example, the 3D position of an object may be based on (or, may be determined by) a triangulation process, which typically requires multiple viewpoints that are generally relatively far from each other or are not co-located next to each other.

The Applicants have realized that when only a single viewpoint or single device is available (e.g., one single imager; or, two cameras co-located very close to each other), different and/or additional sources of information may be utilized in order to complete the 2D visual information that is captured in frames, and to enable its transformation into corresponding 3D data.

For example, the 3D ball trajectory analysis may use mathematical models or ballistic models, or aerodynamic models or other suitable models or rules or parameters or equations, as an additional source of information to predict and/or estimate and/or determine and/or calculate the ball's position at every step or time-point or image.

As another example, the Event Detection process (e.g., item 40a in FIG. 6) performs differentiating of one shot from another shot, or for grouping of a series of frames into a "shot even" group of frames; such as, by monitoring the tracked position of the ball in the camera(s) frames, and by searching for (and detecting) sudden change(s) of direction of movement and/or abrupt changes in location-change pattern, and/or by detecting time delays between tracking instances and sufficiently large differences (e.g., greater than a pre-defined threshold value) between one tracked position to the next tracked position of the ball. Once detected, the relevant ball and players (u, v) coordinates in the camera(s) frames are recorded and transferred to the Trajectory Estimator (e.g., item 90a in FIG. 6).

For example, the hitting player in Tennis is determined by the system of the present invention by using the difference between the ball's "u" coordinates at the last and first frames of the relevant camera. For example, let the first ball coordinates be denoted (Ufirst, Vfirst), and let the last ball coordinates for a specific camera be denoted (Ulast, Vlast); the Sign (negative or positive) of the expression (Ufirst−Ulast) indicates which player has hit the ball. For example, if the expression is positive, then the right-side player (from the camera's point of view) is determined to be the hitting player; otherwise, the left-side player is determined to be the hitting player.

In the Hitting Player Locator (e.g., item 30c in FIG. 8), the homographic calibration matrix calculated in the Automatic Camera Calibrator (e.g., item 70a FIG. 6) is used to convert (i) the player's location on the court as represented in the camera's axis system (Uplayer, Vplayer), into (ii) the player's location coordinates (Xplayer, Yplayer, Zplayer=0) in the tennis court's axis system (e.g., as demonstrated in FIG. 3).

The hitting player's position on the court, calculated by the Hitting Player Locator (e.g., item 30c in FIG. 8), serves as the initial point around which a grid of 3D ball positions is created by the Grid Creator (e.g., item 40c in FIG. 8).

Similar grids are created for the ball azimuth, spin rate, elevation and speed parameters around initial values; for example, defined by using the following demonstrative rules for parameter initialization: Initial elevation is determined, for example, according to the two first ball 3D positions, denoted as (Xball_1, Yball_1, Z ball_1) and (Xball_2, Yball_2, Z ball_2) in the court's axis system (e.g, demonstrated in FIG. 3), such as:

$$\theta = \arctan\left(\frac{Z_{ball\_2} - Z_{ball\_1}}{|X_{ball\_2} - X_{ball\_1}|}\right)$$

Initial azimuth is determined, for example, using the azimuth of internal bisector of the angle created by the two lines joining the first ball 3D position (Xball_1, Yball_1, Z ball_1)) in the court's axis system (e.g., demonstrated in FIG. 3) to the two corners of the tennis court at the opposite side. Alternatively, initial azimuth may be determined, for example, using the line defined by the hitting Player's position on the court and the bouncing location of the ball.

Initial speed is determined, for example, by dividing (a) the distance between the two or more first ball 3D positions (Xball_1, Yball_1, Z ball_1) and (Xball_2, Yball_2, Z ball_2) in the court's axis system (e.g., demonstrated in FIG. 3), by (b) the time elapsed between the two first frames, namely t ball_1 and t ball_2:

$$V = \frac{\sqrt{(X_{ball\_2} - X_{ball\_1})^2 + (Y_{ball\_2} - Y_{ball\_1})^2 + (Z_{ball\_2} - Z_{ball\_1})^2}}{(t_{ball\_2} - t_{ball\_1})}$$

Using each set of initial conditions provided by the Grid Creator (e.g., item 40c in FIG. 8), a 3D ball trajectory is created by the Trajectory Predictor (e.g., item 50c in FIG. 8); for example, according to a dynamic model based on aerodynamic, gravity and/or friction forces, such as in the manner of the following non-limiting example: For the ball Flight, $$F_{Lift} = \frac{1}{2}\rho A C_l |\overline{V}|^2 u$$

With a lift force of:

$$C_l = 1.5 \cdot \frac{|\overline{\omega}|}{|\overline{V}|}$$

With a drag force of:

$$F_{Drag} = -\frac{1}{2}\rho A C_d |\overline{V}| \begin{bmatrix} \dot{x} \\ \dot{y} \\ \dot{z} \end{bmatrix}$$

With gravitational force of:

$$F_{gravity} = -mg$$

The system may determine that:

$$T_{aero} = -T_e r F_{Lift} \frac{|\overline{\omega}|}{|\overline{\omega}|}$$

Wherein, for example,
Taero indicates the moment resulting from the aerodynamical forces applied on the ball during flight;
Te indicates the aerodynamic torque coefficient;
A indicates the cross-section of the ball;
Cl indicates the lift coefficient of the ball;
ρ indicates the air density at ground level;
V indicates the speed of the ball;
g indicates the gravity acceleration or gravitational acceleration;
u indicates the lift force unit direction vector;
ω indicates the angular velocity vector of the ball around its axis of rotation;
Cd indicates the drag coefficient of the ball;
m indicates the mass of the ball;
r indicates the radius of the ball;

$$\begin{bmatrix} \dot{x} \\ \dot{y} \\ \dot{z} \end{bmatrix}$$

indicates the first derivative of the ball's 3D position with respect to time;

$$\begin{bmatrix} x \\ y \\ z \end{bmatrix}$$

indicates the ball's 3D position at a specific time.

For modelling the bounce, the system may utilize, for example:

$$F_{normal} = k(r-z)^2 + b(r-z)d$$

$$F_{friction} = -\mu F_{normal} \frac{\overline{V}_{contact}}{|\overline{V}_{contact}|}$$

$$T_{contact} = r \times F_{friction}$$

Wherein, for example,
Fnormal indicates the force applied on the ball perpendicularly to the ground, at impact with the ground;
k indicates the spring constant of the ball;
b indicates the linear damper coefficient;
Ffriction indicates the friction force applied by the ground surface to the ball;
μ indicates the friction coefficient of the ground surface;
Vcontact indicates the speed of the ball at time of impact with the ground;
Tcontact indicates the moment resulting from the friction force applied on the ball;
Rd indicates the negative of Ż described above.

In some embodiments, using homographic calibration and the camera(s) known position(s), each calculated trajectory is projected onto the camera(s) frames. For each 3D trajectory candidate, the overall errors, meaning the sum of all the differences between the projected 3D trajectory and the measured ball locations by the camera(s), is calculated and stored.

For example, the Error for each 3D trajectory candidate may be determined as:

$$\text{Error} = \sum_{i=1}^{n} \sqrt{\left(u^i_{measured} - u^i_{projected}\right)^2 + \left(v^i_{measured} - v^i_{projected}\right)^2}$$

Wherein, for example,
(Umeasured_i, Vmeasured_i) indicate the pixel's coordinates of the i-th detected feature of interest, as it is measured by the camera and/or imager, in the frame's axis system;
(Uprojected_i, Vprojected_i) indicate the pixel's coordinates of the re-projected i-th feature after homography calculation;
N indicates the total number of detected features used for the calculation of the homography matrix.

The 3D trajectory candidate yielding the minimum error, is chosen as the solution to be utilized as the determined 3D trajectory.

Some embodiments may perform automatic homographic calibration of a camera that is intended to monitor a tennis court as well as to track a tennis ball and/or tennis players.

For example, some calculations performed by the system may utilize projection of (a) the visual information gathered by the camera(s), on (b) the court's plane (e.g., the X-Y plane in the court's axis system, as demonstrated in FIG. 3). The relation or correlation or matching between (A) a pixel's coordinates (u, v), and (B) that pixel's corresponding point (X, Y, Z=0) on the tennis court, may be expressed by the present invention as a "homography" matrix, which is specific to the particular camera, its six degrees pose (X, Y, Z, pitch, yaw, roll) and the plane to which a pixel is to be projected. The system of the present invention may be easily or efficiently or rapidly transferrable from one tennis court to another tennis court, and may be efficiently operated by non-trained personnel or by a single non-professional player or user. The calibration process may thus be performed automatically by the system of the present invention; such as, at pre-defined time intervals or when particular events are detected; such as, upon initial activation of the system; once per minute, once per hour, once per day, once per K hours; every time that a GPS unit (or other location-determination unit) or an accelerometer or a gyroscope of an orientation-sensor of the system indicates that the system has been moved or rotated or has changed its location or has changed is orientation or direction or slanting or if there exists an indication or an estimation or a determination that the ambient temperature has significantly changed (e.g., based on actual temperature measurement which may be performed by an integrated thermometer or by an add-on thermometer unit or accessory; or based on wirelessly receiving weather data or local temperature data from a remote server which indicates or broadcasts the current local temperature or the current local weather conditions); if the system switches from utilizing one camera to two cameras, or vice versa; if the system switches from using a first camera (out of several available cameras) to using another cameras of those several available cameras; if the user commands such calibration; or the like.

For example, the Court Detector (e.g., item 30a in FIG. 6) uses a color contrast-based detection algorithm to extract the court lines from the background on (or within) the frame captured by the camera(s).

Then, in some embodiments, the intersection points of these court lines are determined by the Calibration Points Finder (e.g., item 30d in FIG. 9), to provide reference points whose exact coordinates in the court's axis system are known from the court's definitions (e.g., demonstrated in FIG. 3), and/or via the method of calibration that was described above with reference to FIG. 13.

For example, Six of these intersection points are identified and saved, along with their known position: (1) The intersection between the baseline and the single court left sideline; (2) The intersection between the baseline and the single court right sideline; (3) The intersection between the service line and the single court left sideline; (4) The intersection between the service line and the single court right sideline; (5) The intersection between the center line and the service line; (6) The intersection between the prolongation of the centerline beyond the service line, and the baseline. FIG. 11 demonstrates these demonstrative intersection points; although other points and/or additional points may be used, in other embodiments. In other embodiments, as demonstrated with reference to FIG. 13, ten intersection points per half-court may be determined and utilized. Other suitable methods may be used.

In some embodiments, optionally, a grid or array or matrix (e.g., of 5×5 pixels) is defined around each one of the six relevant intersection points saved by the Calibration Points Finder (e.g., item 30d in FIG. 9); for example, the identified intersection is located in the center of such grid (e.g., as demonstrated in FIG. 10). This 5×5 grid represents the 25 potential intersection locations assuming a two-pixel margin of error on the coordinates "u" and "v". In some embodiments, n points (wherein n<25) are randomly or pseudo-randomly chosen in the 5×5 grid, for further processing.

The PnP Problem Solver (e.g., item 50d in FIG. 9) solves the perspective n-point (PnP) problem for each combination of the stored pixels (n6 in total), using a suitable numerical method.

For example, a demonstrative homography three-by-three matrix M may be determined such that:
wherein $$\begin{pmatrix} \tilde{u} \\ \tilde{v} \\ \tilde{w} \end{pmatrix} = \lambda \begin{pmatrix} u \\ v \\ 1 \end{pmatrix} = M \begin{pmatrix} X \\ Y \\ 1 \end{pmatrix}$$

($\tilde{u}$ $\tilde{v}$ $\tilde{w}$) are the detected pixels,
and wherein (X, Y) are the corresponding 3D points with Z=0.

For each combination of the stored pixels, the 3D known points are re-projected on the camera(s) frame using the determined M solution, such as:

$$\begin{pmatrix} X' \\ Y' \\ 1 \end{pmatrix} = \lambda M^{-1} \begin{pmatrix} u \\ v \\ 1 \end{pmatrix}$$

The error of each projection candidate is then determined, for example as:

$$\text{error} = \sqrt{\sum_{i=1}^{n} |(X_i - X'_i \quad Y_i - Y'_i)|^2}$$

Then, the homography solution M and the calibration points are chosen as the ones yielding the smallest error out of the group of projection candidates.

In some embodiments, a Bounce Event Detector Unit may utilize the determined or estimated coordinates of the ball's bounce (Xbounce, Ybounce, wherein Zbounce=0) (e.g., as demonstrated in FIG. 3) that are provided by the Bounce Position Estimator (e.g., item 60b in FIG. 7), in order to determine whether a Bounce Event has occurred, as well as its properties. For example, in some embodiments, around the calculated ball bounce location (Xbounce, Ybounce, wherein Zbounce=0), an "impact area" may be defined, for example, relatively to the estimated speed and direction of the ball (e.g., in a demonstrative implementation, the faster the ball bounces on the ground or hits the ground, the more "oval shaped" and "stretched" or "squeezed" is its impact area on the ground); and the impact area, and its particular shape and/or size and/or dimensions, may enable the system to generate insights with regard to occurrence of a Bounce Event, the speed at which the ball has hit the ground (e.g., by comparing the deformation in the shape of the ball, relative to a perfect circle, to a lookup table or list or a pre-defined set of threshold values that correspond to various ground-hitting speeds).

The present invention may provide a computer-vision device or system, which may be implemented as easily operated and easily installed system, particularly tailored to assist or guide players of tennis. The combined presented methods, or some of them, allow for game analysis and/or match analysis as well as a single shot analysis or a single tennis-point analysis, using recorded or captured frames only as external information (or, optionally, in combination with other information or measurements). The player and ball detection process (e.g., items 50a and 60a in FIG. 7), combined with an automatic calibration (e.g., item 70a in FIG. 7), allow tracking and locating of the tennis ball and/or the player at one or more moments of interest (or, substantially continuously) during the game, such as at the ball impact with the ground (e.g., item 80a in FIG. 7), and/or during a specific shot (e.g., item 90a in FIG. 7).

These combined capabilities enable a complete end-to-end solution for player's performance analysis, and video recording for different sports and particularly for the game of Tennis and/or for other racquet-based sports.

Some embodiments comprise a single-device vision-based monitoring and analysis system, particularly for the game of Tennis, positioned on one side and at half-length of the tennis court; which includes, for example:

(a) one single camera, or two or more co-located cameras, having a field-of-view or a combined (e.g., partially overlapping) field-of-view which covers the relevant areas of interest (e.g., an entirety of the tennis court), and capturing or acquiring or generating images or video frames which include at least one of (or some of, or all of): the ball in play, the players, and the court's lines (or borders);

(b) a Ball and Players Detector, which analyzes the captured frames, and determines the ball and the players location in the captured frames;

(c) a Court Locator, which detects the tennis court's lines and records their location in the captured frames;

(d) a Ball Bounce Position Estimator, which, for example:

(d1) monitors the ball position in the frame for a specific shot;

(d2) detects the frame at which the ball is the closest to its point of impact with the ground;

(d3) defines two subsets of ball location data, a first subset relates to frames before the bounce event (and within the same tennis-shot event), and a second subset relates to frames after the bounce event (and within the same tennis-shot event);

(d4) fits or matches between (i) each one of the two subsets of ball location data, and (ii) its own corresponding modelled curve (e.g., a generally ballistic route), such as by using a nonlinear optimization process;

(d5) determines the intersection between the two modelled curves, to generate the bounce-location pixel coordinates;

(d6) projects the determined bounce-location from the camera frame coordinates to the court plane coordinates, to determine (or to convert into) the bounce-location in the court's axis system.

In some embodiments, the device or the system comprises a 3D Ball Trajectory Estimation Unit, which:

(f1) determines the hitting player, by processing the detection data extracted from frames of the relevant camera(s);

(f2) performs automatic camera calibration, to convert (A) the player's location on the court in the camera's axis system, to (B) the corresponding coordinates in the court's axis system;

(f3) creates a grid of 3D initial ball positions in proximity to the hitting player;

(f4) determines the predicted ball trajectory using a dynamic model which takes into account, for example, aerodynamics, friction forces, and gravitational force;

(f4) determines the best candidate for 3D ball trajectory, by minimizing the error between (A) the predicted ball trajectory's projection on the camera(s) frame, and (B) the detected position of the ball in the camera(s) frame's axis system.

In some embodiments, the device or the system comprises an automatic homographic camera calibration module, which (for example):

(g1) determines the coordinates of the detected court lines' intersections;

(g2) identifies and records multiple particular intersections, such as, for example: (i) the intersection between the baseline and the single court left sideline; (ii) the intersection between the baseline and the single court right sideline; (iii) the intersection between the service line and the single court left sideline; (iv) the intersection between the service line and the single court right sideline; (v) the intersection between the center line and the service line; (vi) the intersection between the prolongation of the centerline beyond the service line, and the baseline;

(g3) creates or selects a grid of pixels, around each of the saved intersection points (e.g., around each one of those six saved intersection points);

(g4) performs a computerized method that solves the perspective n-point problem for (at least) a pre-determined subset combination of the intersection points;

(g5) determines the homography calibration matrix by minimizing the re-projection error for the pre-determined subset of the intersection points combinations.

Figure 15:
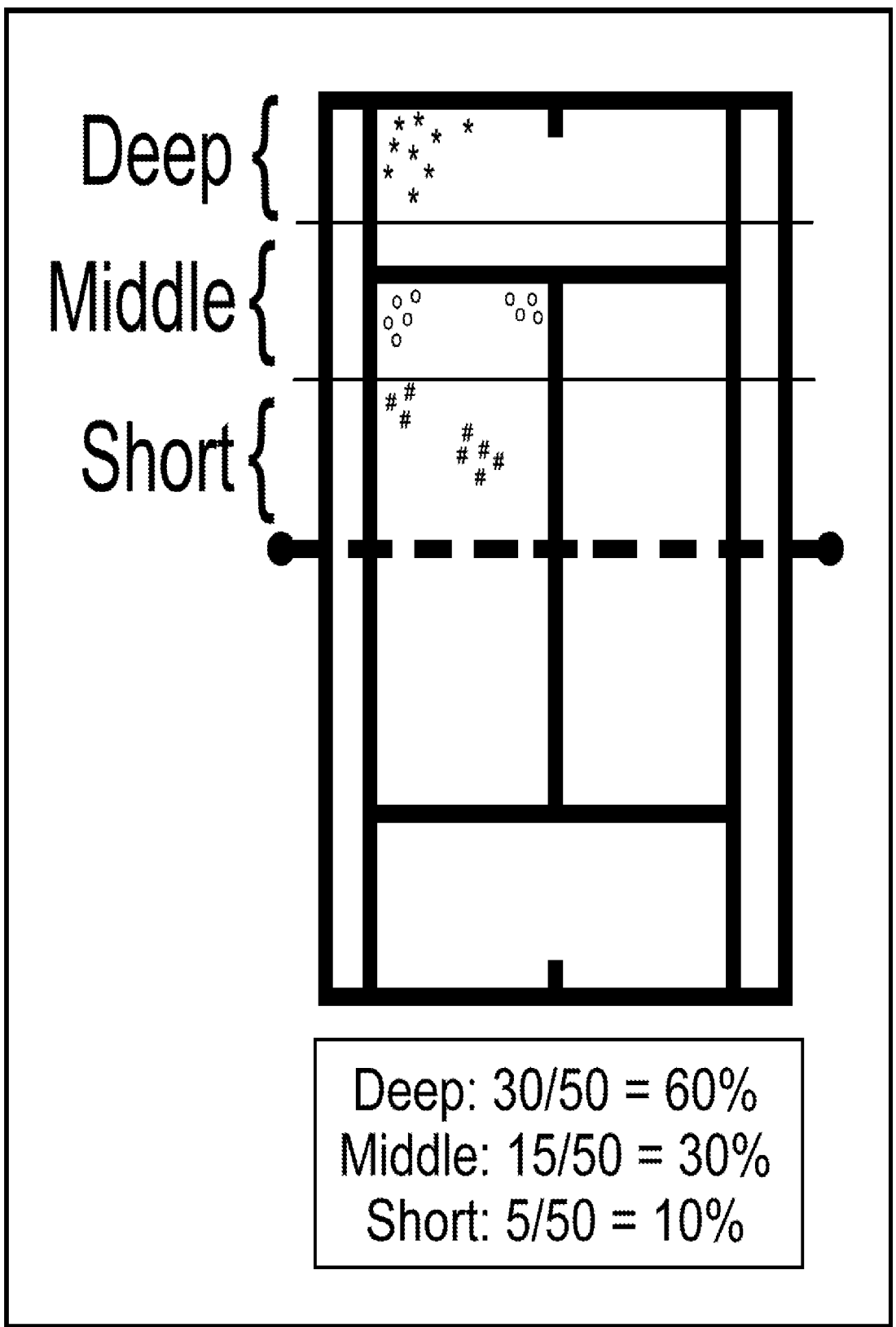
FIG. 15 is a schematic illustration of a display screen demonstrating output generated by some demonstrative embodiments of the present invention.

Reference is made to FIG. 15, which is a schematic illustration of a display screen 1500 demonstrating output generated by some demonstrative embodiments of the present invention. The output may be shown on a smartphone, a tablet, a smart-watch, a laptop computer, a dedicated or stand-alone output unit, or other device; in real-time while a tennis game is being played or during practice (e.g., shown to a tennis coach or counselor), in near-real-time, or retro-actively after the game or practice has ended and the player(s) wish to review their performance.

In some embodiments, the display unit shows a Placement Map, indicating locations in which the tennis ball had hit the ground (within the tennis court, and/or externally to the tennis court) during such tennis game or practice session. Uniquely, some embodiments of the present invention may define multiple virtual regions or zones, depicted in the drawing as a Deep zone, a Middle zone, and a Short zone; for example, three rectangular zones, each one having a long edge that is parallel to the net of the tennis court, each rectangle having a long edge that is generally equal in length to the length of the net of the tennis court; the three zones together overlapping in aggregate with the largest rectangle in the tennis court; each such rectangular zone covering approximately one-third of the largest rectangle in the tennis court. Based on the computer-vision algorithms of the present invention, which utilize the one or more imagers or the dual co-located imagers, and further utilize the modelling of two fitted-curves (e.g., a pre-bounce fitted curve, and a post-bounce fitted curve) to estimate the bounce location, the system may indicate the placement of multiple bounces during a game or a practice session. The system may further indicate which percentage of all such bounces, by Player A, have occurred in the Deep zone, or in the Middle zone, or in the Short zone; thereby generating and providing to Player A unique insights that may assist him to improve his playing skills. The placement may be performed by the computer-vision algorithms of the present invention; for example, by calibrating the imager(s) to recognize the border lines or the court lines; by defining automatically the three rectangular zones (or other number and/or shape of zones) by dividing the imaged field-of-view of into multiple such areas-of-interest or zones-of-interest, and by tracking the movement of the tennis ball in video frames or image frames to determine the bounce location based on two fitted curves or two mathematically/physically modelled flight curves (pre-bounce and post-bounce) that intersect, and by determining in which pre-defined zone such bounce has occurred; and by further tracking the number of bounces and the percentage of bounces in each such zone; thereby enabling the system to generate such output, depicting visually the distribution of ball-bounces across the multiple zones, and/or indicating via text or via graphical elements (e.g., a pie chart, a bar chart, a table, or the like) the respective number of bounces and/or the percentage of bounces in each zone. Optionally, ball-bounce locations may be represented by different on-screen elements (e.g., points or X signs or asterisk characters; or, points having different colors and/or different thickness), to associate between a cluster of locations and a particular zone-of-interest.

In some embodiments, the system may be configured to recognize whether a particular ball-bounce, that occurred in a particular zone (e.g., in the Deep zone), has occurred as part of a regular shot by Player A, or due to a Serve shot by Player A, or due to a Return shot by Player A (e.g., immediately in response to a Serve shot by Player B); and may generate statistics or analytics data separately for each type of such ball-bounce. For example, a Serve shot of Player A may be recognized by the system, due to computer-vision analysis that indicates that Player A has lifted his arm high above his head and made a particular over-head curved motion that characterizes a Serve shot; and/or by using an analysis that indicates that the ball was in the hand of Player A immediately prior to such shot, or that the ball was not in flight immediately prior to such shot. A Return shot may be recognized, for example, by being the first shot that Player A performed immediately after a Serve shot was recognized with regard to Player B. A "Regular" shot may be recognized, for example, by being any other shot other than a Serve shot and a Return shot. The system may thus identify each type of shot, and may aggregate the data about the placement of each type of shot into the specific zone. For example, the system may uniquely generate an output that indicates, visually and/or textually, that: (a) 60% of the serve shots of Player A were deep; (b) 15% of the serve shots of Player A were middle; (c) 25 percent of the serve shots of Player A were short; (d) 50% of return shots of Player A were deep; (e) 20% of return shots of player A were middle; (f) 30% of return shots of player A were short; (g) 85% of regular shots of Player A were deep; (h) 10% of regular shots of Player A were middle; (i) 5% of return shots of Player A were short. The system may further generate aggregated data, such as: (a) that 75% of the shots of Player A, no matter which type of shot they were, have bounced in the Deep zone; (b) that 20% of the shots of Player A, no matter which type of shot they were, have bounced in the Middle zone; (c) that 5% of the shots of Player A, no matter which type of shot they were, have bounced in the Short zone.

It is emphasized that the three demonstrative zones, denoted as Deep and Middle and Short, are defined by the system automatically and/or by a user (player, coach) manually, as three virtual zones, that are not drawn on the ground or surface of the actual tennis court in the real world, and do not entirely or fully overlap with (or be defined by) the real-world tennis court borderlines or court-lines. For example, one edge or two edges of each such zone, may optionally overlap with a real-world tennis-court line; however, at least one edge of each such Zone, is an edge that does Not exist as a real-world tennis court line on the ground surface of the tennis court, and rather, it is only defined virtually or mathematically within the system. This feature is unique as it enables the present invention to divide ball-bounce placement data across multiple such Virtual Zones, that do not fully correspond to real-world tennis-court zones that are defined by real-world tennis court surface lines. Furthermore, in some embodiments, the size or shape or location of such Virtual Zones, may be user-modifiable or user-customizable; enabling a user to modify the size (or location) of the zone that is defined as the "Deep" zone, thereby enlarging it or shrinking it, in order to assist such player to train in relation to a particular target zone.

Figure 16:
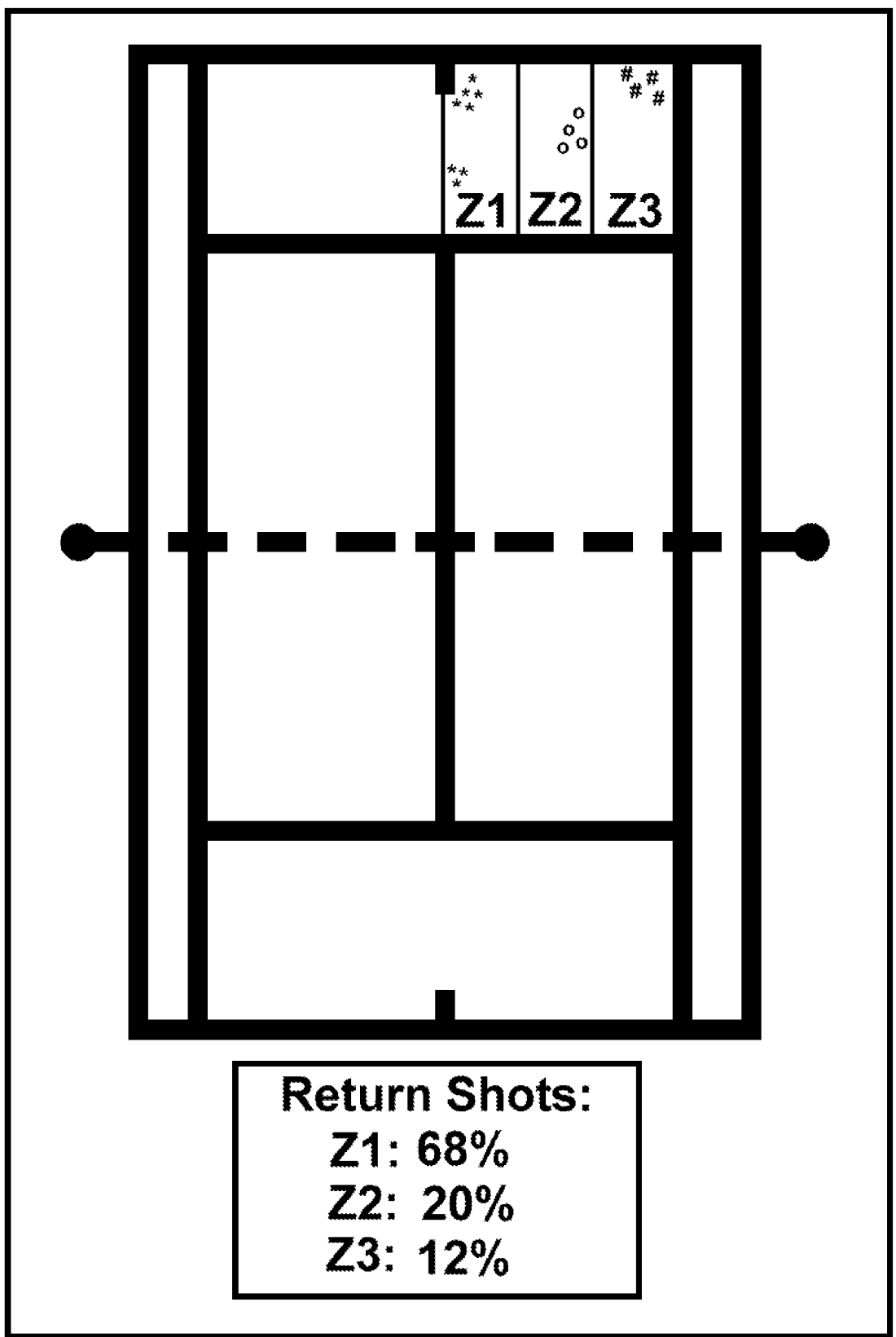
FIG. 16 is a schematic illustration of a display screen demonstrating another output generated by some demonstrative embodiments of the present invention.

Reference is made to FIG. 16, which is a schematic illustration of a display screen 1600 demonstrating another output generated by some demonstrative embodiments of the present invention. Similar to the above-mentioned output, the current output may be generated to indicate whether the shots of Player A have landed in three zones indicated as Zone 1 (Z1), Zone 2 (Z2) and Zone 3 (Z3); and indicating visually the placement of ball-bounce in each such zone, and indicating graphically and/or textually the distribution of the ball-bounces in each such zone. For example, each one of these three demonstrative zones may be an elongated rectangle, having a long edge that is perpendicular to the net of the tennis court; and having a short edge that is overlapping to a portion of the baseline of the tennis court. In some embodiments, the Zones may have different sizes or areas, and/or different width or length, and/or different shapes (e.g., a first zone being rectangular, next to a second zone being circular), may be adjacent to each other or entirely separated from each other, or the like; may be defined a-priori by the system or may be hard-coded, or may be user-defined or user-customizable or user-modifiable. The placement data of ball-bounces on a visual representation or a "map" of the tennis court (or a portion of the tennis court) may optionally be classified by the type of shot (e.g., as demonstrated above, separating among Serve shots and Return shots and Other "regular" types of shots).

Figure 17:
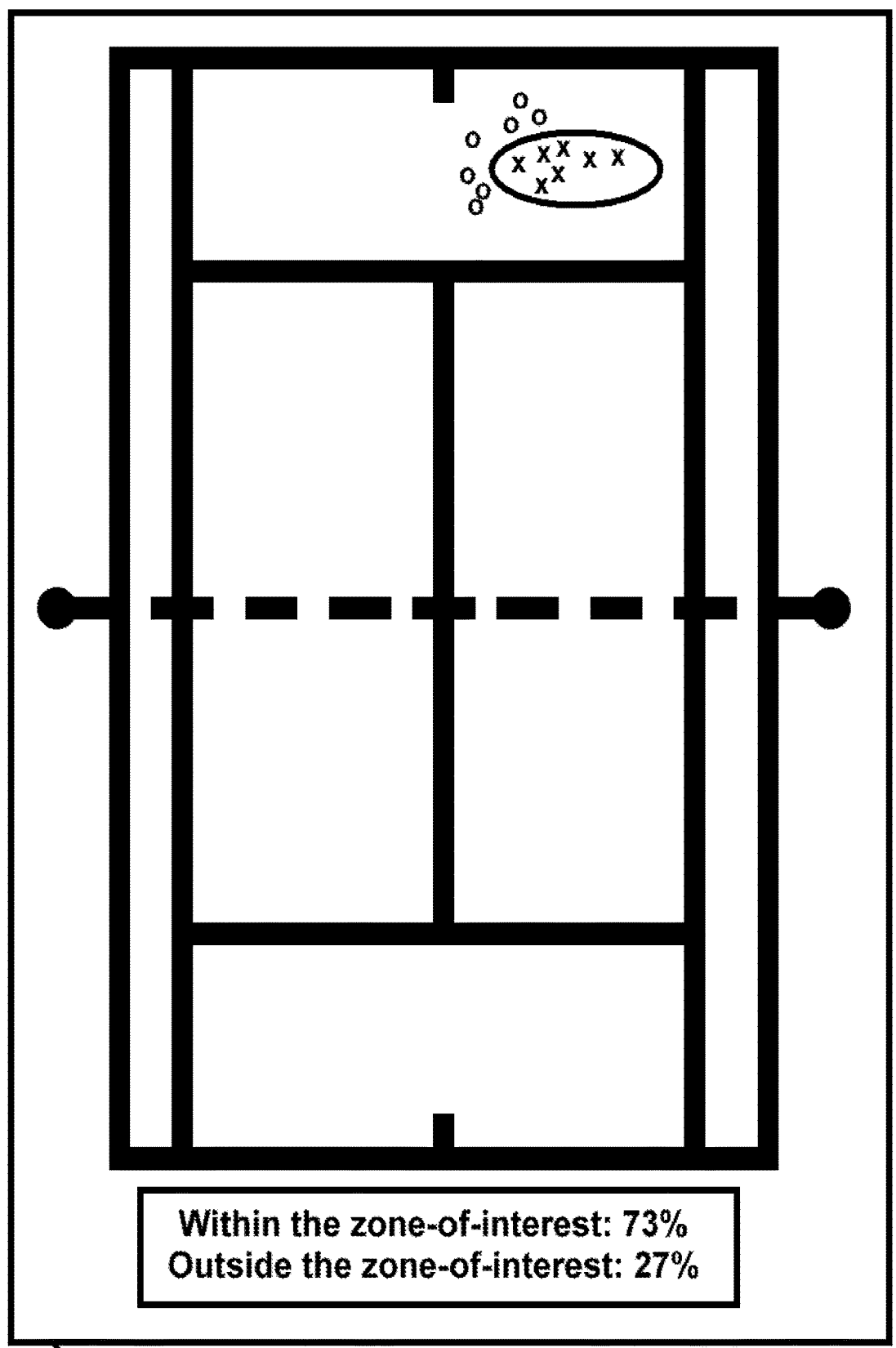
FIG. 17 is a schematic illustration of a display screen demonstrating yet another output generated by some demonstrative embodiments of the present invention.

Reference is made to FIG. 17, which is a schematic illustration of a display screen 1700 demonstrating yet another output generated by some demonstrative embodiments of the present invention. Similar to the above-mentioned outputs, the current output may be generated to indicate whether ball-bounce events have occurred within or externally to a user-defined shape or regions-of-interest or region of interest, that a player (or a coach) may define virtually via an input unit (e.g., moving his finger on a touch-screen or a touch-pad to draw a zone-of-interest on a screen image of a tennis court). For example, a player or a coach may view a graphical image of a tennis court, or a schematic illustration of a tennis court, or an actual image or dual-images of the actual tennis court; and may utilize a touch-screen or a touch-pad to draw on it a zone-of-interest, such as, a free-hand drawing of a circle or oval or rectangle or any shape (e.g. a star, a croissant, a half-circle) at a particular location (e.g., near a corner of the tennis court; in the middle of the serve zone; near the indicator of the center line; or the like). The system may then operate to recognize or detect, whether ball-bounce events have occurred within such virtual user-defined zone-of-interest, or externally to it. The placement data may optionally be classified by the type of shot (e.g., as demonstrated above, separating among Serve shots and Return shots and Other "regular" types of shots).

The present invention may further distinguish among shots based on other criteria; and may detect or recognize or identify, for example, a First Serve or a Second Serve, based on the timing of each shot or serve, based on analysis of events that happened before such serve (e.g., identifying that Shot number 125 of Player A is a First Serve; identifying that it hit the net; and thus identifying that Shot number 126 of Player A is a Second serve). The system may thus utilize the one or more imagers or the dual co-located imagers, with the computer-vision algorithms described above, to determine and track the number and percentage of successful First Servers, or Second Serves, or "Ace" shots", or double faults. Some embodiments may further analyze the video frames or images to accumulate data regarding the number of points (and/or the percentage of points) that were won (or lost) by Player A when Player A was serving, or when Player A was returning. Some embodiments may further utilize computer-vision to recognize whether a particular shot of Player A was a forehand shot or a backhand shot, based on the direction or shape of movement of the player and/or his racket; thereby enabling the system to generate analytics (in real time, or in near real time, or retroactively) with regard to particular type(s) of shots.

Some embodiments of the present invention may optionally include or utilize, one or more of the components and/or operations that are described in U.S. Pat. Nos. 9,694,238 and/or 10,143,907 and/or 6,816,185, all of which are hereby incorporated by reference in their entirety.

Some embodiments, optionally, utilize one or more of the above generated data-items, to generate at least one insight with regard to the ball's route, the player's performance, and/or other properties or results or insights.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments of the present invention may be implemented by using hardware components, software components, a processor, a processing unit, a processing core, a controller, an Integrated Circuit (IC), a memory unit (e.g., RAM, Flash memory), a storage unit (e.g., Flash memory, hard disk drive (HDD), sold state drive (SSD), optical storage unit), an input unit (e.g., keyboard, keypad, touch-screen, microphone, mouse, touch-pad), an output unit (e.g., monitor, screen, audio speakers, touch-screen), wireless transceiver, Wi-Fi transceiver, cellular transceiver, power source (e.g., rechargeable battery; electric outlet), an Operating System (OS), drivers, applications or "apps", and/or other suitable components.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
(A) a first camera and a second camera, co-located and enclosed within a same housing;
  wherein the first camera is aimed along a first aiming vector, wherein the second camera is aimed along a second aiming vector, wherein the first and second aiming vector form an angle in the range of 20 to 120 degrees;
  wherein, upon mounting of said device on or in proximity to an edge of a net of a tennis court, the first camera is configured to capture a first set of images of a first segment of the tennis court, and the second camera is configured to capture a second set of images of a second segment of the tennis court,
  wherein the first segment of the tennis court and the second segment of the tennis court include at least an overlapping portion of the tennis court that is captured by both the first camera and the second camera,
  wherein a combination of the first segment of the tennis court and the second segment of the tennis court corresponds to at least 75 percent of an entirety of the tennis court;
(B) a memory unit to store (i) the first set of images captured by the first camera, and (ii) the second set of images that are captured simultaneously by the second camera;
(C) a hardware processor configured to execute a computer-vision algorithm that analyzes the first set of images and the second set of images, and that detects at least two of:
  (i) a first human player,
  (ii) a second human player,
  (iii) a tennis ball,
  (iv) one or more court lines that define the tennis court;
  wherein the computer-vision analysis,
(a) receives as user input, a user-defined zone-of-interest in said tennis court;
(b) determines, for each ball-bounce event, whether the ball-bounce event occurred within or externally to said user-defined zone-of-interest;
(c) generates at least one of: (i) visual representation of placement of ball-bounce events within and without said user-defined zone-of-interest; (ii) on-screen representation of the number or percentage of ball-bounce events within and without said user-defined zone-of-interest.

2. The system according to claim 1,
wherein said computer-vision algorithm operates by:
(a) creating a grid of initial possible tennis-ball positions, ball speed and ball spin in proximity to a hitting player;
(b) for each initial possible tennis-ball position, determining a predicted tennis-ball flight trajectory using a model that takes into account at least gravitational force, drag force and lift force;
(c) determining a candidate of said predicted tennis-ball flight trajectory, by minimizing a difference between (I) the projection of the predicted tennis-ball flight trajectory from each initial possible tennis-ball position, and (II) a computer-vision detected tennis-ball flight trajectory captured in at least one of: the first set of images captured by the first camera, and the second set of images captured by the second camera.

3. A system comprising:
(A) a first camera and a second camera, co-located and enclosed within a same housing;
  wherein the first camera is aimed along a first aiming vector, wherein the second camera is aimed along a second aiming vector, wherein the first and second aiming vector form an angle in the range of 20 to 120 degrees;
  wherein, upon mounting of said device on or in proximity to an edge of a net of a tennis court, the first camera is configured to capture a first set of images of a first segment of the tennis court, and the second camera is configured to capture a second set of images of a second segment of the tennis court,
  wherein the first segment of the tennis court and the second segment of the tennis court include at least an overlapping portion of the tennis court that is captured by both the first camera and the second camera,
  wherein a combination of the first segment of the tennis court and the second segment of the tennis court corresponds to at least 75 percent of an entirety of the tennis court;
(B) a memory unit to store (i) the first set of images captured by the first camera, and (ii) the second set of images that are captured simultaneously by the second camera;
(C) a hardware processor configured to execute a computer-vision algorithm that analyzes the first set of images and the second set of images, and that detects at least two of:
  (i) a first human player,
  (ii) a second human player,
  (iii) a tennis ball,
  (iv) one or more court lines that define the tennis court;
  wherein the computer-vision analysis,
(a) defines a first zone-of-interest, which does not fully overlap with any court-line-defined region of the tennis court;
(b) defines a second zone-of-interest, which does not fully overlap with any court-line-defined region of the tennis court;
(c) generates a determination, for each ball-bounce event, whether the ball-bounce event occurred (i) within the first zone-of-interest, or (ii) within the second zone-of-interest, or (iii) externally to the first and second zones-of-interest;
(d) generates at least one of: (i) visual representation of placement of ball-bounce events within the first zone-of-interest, within the second zone-of-interest, and externally to them; (ii) on-screen representation of the number or percentage of ball-bounce events within and without each one of the first and second zones-of-interest.

4. The system according to claim 3,
wherein said computer-vision algorithm determines at least:
an average speed of flight of said tennis ball within a tennis shot,
a distance of over-the-net clearance of said tennis ball relative to the net of the tennis court,
a ball bounce location in said tennis court.

5. A system comprising:
(A) a first camera and a second camera, co-located and enclosed within a same housing;
  wherein the first camera is aimed along a first aiming vector, wherein the second camera is aimed along a second aiming vector, wherein the first and second aiming vector form an angle in the range of 20 to 120 degrees;
  wherein, upon mounting of said device on or in proximity to an edge of a net of a tennis court, the first camera is configured to capture a first set of images of a first segment of the tennis court, and the second camera is configured to capture a second set of images of a second segment of the tennis court,
  wherein the first segment of the tennis court and the second segment of the tennis court include at least an overlapping portion of the tennis court that is captured by both the first camera and the second camera,
  wherein a combination of the first segment of the tennis court and the second segment of the tennis court corresponds to at least 75 percent of an entirety of the tennis court;
(B) a memory unit to store (i) the first set of images captured by the first camera, and (ii) the second set of images that are captured simultaneously by the second camera;
(C) a hardware processor configured to execute a computer-vision algorithm that analyzes the first set of images and the second set of images, and that detects at least two of:
  (i) a first human player,
  (ii) a second human player,
  (iii) a tennis ball,
  (iv) one or more court lines that define the tennis court;
(D) a Ball Bounce Location Estimator, configured to analyze the first set of images and the second set of images, and to automatically detect:
  (I) existence and a location of a ball bounce event in at least one of: the first set of images, and the second set of images; and
  (II) in-image pixel-based location of said ball bounce event; and
  (III) real-world location of said ball bounce event;
  wherein said Ball Bounce Location Estimator operates by taking into account at least:
  a detection that the shape of the tennis ball (I) is circular in a first image, and (ii) is elliptic in a second image that is subsequent to the first image, and (III) is circular in a third image that is subsequent to the second image;
  wherein the first image, the second image, and the third image are three images that are selected from the group consisting of: the first set of images captured by the first camera, and the second set of images captured by the second camera.

6. The system according to claim 5,
wherein said Ball Bounce Location Estimator operates by:
(a) tracking the tennis ball position across a subset of images associated with a tennis shot that includes an impact of the tennis ball with a surface of said tennis court, wherein said subset of images comprises two or more images selected from the first set of images and the second set of images;
(b) generating a first mathematical equation that corresponds to a first curved flight of the tennis ball prior to said impact;
(c) generating a second mathematical equation that corresponds to a second curved flight of the tennis ball subsequent to said impact;
(d) determining a location of said ball bounce event based on a computed intersection of the first curved flight and the second curved flight.

7. A system comprising:
(A) a first camera and a second camera, co-located and enclosed within a same housing;
wherein the first camera is aimed along a first aiming vector, wherein the second camera is aimed along a second aiming vector, wherein the first and second aiming vector form an angle in the range of 20 to 120 degrees;
wherein, upon mounting of said device on or in proximity to an edge of a net of a tennis court, the first camera is configured to capture a first set of images of a first segment of the tennis court, and the second camera is configured to capture a second set of images of a second segment of the tennis court,
wherein the first segment of the tennis court and the second segment of the tennis court include at least an overlapping portion of the tennis court that is captured by both the first camera and the second camera,
wherein a combination of the first segment of the tennis court and the second segment of the tennis court corresponds to at least 75 percent of an entirety of the tennis court;
(B) a memory unit to store (i) the first set of images captured by the first camera, and (ii) the second set of images that are captured simultaneously by the second camera;
(C) a hardware processor configured to execute a computer-vision algorithm that analyzes the first set of images and the second set of images, and that detects at least two of:
(i) a first human player,
(ii) a second human player,
(iii) a tennis ball,
(iv) one or more court lines that define the tennis court;
(D) a Ball Bounce Location Estimator, configured to analyze the first set of images and the second set of images, and to automatically detect:
(I) existence and a location of a ball bounce event in at least one of: the first set of images, and the second set of images; and
(II) in-image pixel-based location of said ball bounce event, and
(III) real-world location of said ball bounce event;
wherein said Ball Bounce Location Estimator operates by taking into account at least:
a detection that the tennis ball (I) has a first size in a first image, and (ii) has a second, different, size in a second image that is subsequent to the first image, and (III) again has the first size in a third image that is subsequent to the second image;
wherein the first image, the second image, and the third image are three images that are selected from the group consisting of: the first set of images captured by the first camera, and the second set of images captured by the second camera.

8. The system according to claim 7,
wherein, based on analysis of the first set of images and the second set of images, the computer-vision analysis generates at least the following parameters:
speed of flight of the tennis ball,
spin characteristic of the tennis ball,
net clearance height of the tennis ball,
bounce location of the tennis ball,
elevation of the tennis ball,
player position,
azimuth of the tennis shot,
rally length,
hitting height.

9. The system according to claim 7,
wherein said Ball Bounce Location Estimator operates by taking into account both (i) a change in size and (ii) a change in shape, of the tennis ball, across three or more images that are selected from the first set of images and the second set of images.

10. A system comprising:
(A) a first camera and a second camera, co-located and enclosed within a same housing;
wherein the first camera is aimed along a first aiming vector, wherein the second camera is aimed along a second aiming vector, wherein the first and second aiming vector form an angle in the range of 20 to 120 degrees;
wherein, upon mounting of said device on or in proximity to an edge of a net of a tennis court, the first camera is configured to capture a first set of images of a first segment of the tennis court, and the second camera is configured to capture a second set of images of a second segment of the tennis court,
wherein the first segment of the tennis court and the second segment of the tennis court include at least an overlapping portion of the tennis court that is captured by both the first camera and the second camera,
wherein a combination of the first segment of the tennis court and the second segment of the tennis court corresponds to at least 75 percent of an entirety of the tennis court;
(B) a memory unit to store (i) the first set of images captured by the first camera, and (ii) the second set of images that are captured simultaneously by the second camera;
(C) a hardware processor configured to execute a computer-vision algorithm that analyzes the first set of images and the second set of images, and that detects at least two of:
(i) a first human player,
(ii) a second human player,
(iii) a tennis ball,
(iv) one or more court lines that define the tennis court;
wherein at least one of (I) said computer vision algorithm, and (II) said processor,
performs computer-vision analysis (a) that utilizes an initial manual-calibration image of an idle tennis ball, and (b) that extracts from said initial manual-calibration image one or more visual features of said idle tennis ball, and (c) that tracks said one or more visual features across a subset of multiple images of said first set of images and said second set of images.

11. The system according to claim 10,
wherein said computer-vision analysis determines a mathematical function which takes into account at least (i) two vertical lines and (ii) two horizontal lines, and recovers a homography matrix which maps image-pixels to real-world coordinate systems.

12. The system according to claim 10,
wherein at least one of (I) said computer vision algorithm, and (II) said processor, performs computer-vision analysis (a) that utilizes an initial manual-calibration image of an idle tennis player, and (b) that extracts from said initial manual-calibration image one or more visual features of said idle tennis player, and (c) that tracks said one or more visual features across the subset of multiple images of said first set of images and said second set of images.

13. The system according to claim 10,
wherein at least one of (I) said computer vision algorithm, and (II) said processor,
performs computer-vision analysis (a) that utilizes an initial manual-calibration image of a surface of said tennis court which is unobstructed by a tennis ball and is unobstructed by a tennis player, and (b) that extracts from said initial manual-calibration image one or more visual features of said surface of said tennis court, and (c) that tracks said one or more visual features across a subset of multiple images of said first set of images and said second set of images.

14. A system comprising:
(A) a first camera and a second camera, co-located and enclosed within a same housing;
  wherein the first camera is aimed along a first aiming vector, wherein the second camera is aimed along a second aiming vector, wherein the first and second aiming vector form an angle in the range of 20 to 120 degrees;
  wherein, upon mounting of said device on or in proximity to an edge of a net of a tennis court, the first camera is configured to capture a first set of images of a first segment of the tennis court, and the second camera is configured to capture a second set of images of a second segment of the tennis court,
  wherein the first segment of the tennis court and the second segment of the tennis court include at least an overlapping portion of the tennis court that is captured by both the first camera and the second camera,
  wherein a combination of the first segment of the tennis court and the second segment of the tennis court corresponds to at least 75 percent of an entirety of the tennis court;

(B) a memory unit to store (i) the first set of images captured by the first camera, and (ii) the second set of images that are captured simultaneously by the second camera;
(C) a hardware processor configured to execute a computer-vision algorithm that analyzes the first set of images and the second set of images, and that detects at least two of:
  (i) a first human player,
  (ii) a second human player,
  (iii) a tennis ball,
  (iv) one or more court lines that define the tennis court,
  wherein said computer-vision analysis performs:
(a) based on analysis of said first set of images and said second set of images, generating a first linear equation which corresponds to a first border-line of said tennis court;
(b) based on analysis of said first set of images and said second set of images, generating a second linear equation which corresponds to a second border-line of said tennis court;
(c) determining a ball bounce location based on two modelled fitted curves that correspond mathematically to pre-bounce flight and post-bounce flight of the tennis ball, without relying on a pixel-based distance between an image-depiction of said tennis-ball and an image-depiction of border-lines of said tennis court.

15. The system according to claim 14,
wherein said computer-vision analysis determines a mathematical function which maps image-pixels to real-world coordinate systems, and which takes into account a set of intersections that comprise at least:
  (i) an intersection between a tennis-court baseline and a singles court left sideline;
  (ii) an intersection between the tennis-court baseline and a singles court right sideline;
  (iii) an intersection between a tennis-court service line and said singles court left sideline;
  (iv) an intersection between said tennis-court service line and said singles court right sideline;
  (v) an intersection between a tennis-court centerline and said service line;
  (vi) an intersection between: (a) said tennis-court baseline, and (b) a prolongation of said tennis-court centerline beyond said tennis-court service line.

16. The system according to claim 14,
wherein said computer-vision analysis further comprises:
(A) selecting a grid of pixels, around each intersection of said set of intersections;
(B) determining a solution of a perspective n-point (PnP) problem for at least a subset of two or more intersections of said set of intersections.

* * * * *